US011993094B2

(12) United States Patent
Mizuno et al.

(10) Patent No.: US 11,993,094 B2
(45) Date of Patent: May 28, 2024

(54) REVERSIBLE RECORDING MEDIUM AND EXTERIOR MEMBER

(71) Applicant: Sony Corporation, Tokyo (JP)

(72) Inventors: Hiroshi Mizuno, Tokyo (JP); Hirohisa Amago, Tokyo (JP); Kazumasa Nomoto, Tokyo (JP); Nobukazu Hirai, Tokyo (JP); Takehisa Ishida, Tokyo (JP)

(73) Assignee: Sony Corporation, Tokyo (JP)

( * ) Notice: Subject to any disclaimer, the term of this patent is extended or adjusted under 35 U.S.C. 154(b) by 714 days.

(21) Appl. No.: 17/256,866

(22) PCT Filed: May 16, 2019

(86) PCT No.: PCT/JP2019/019457
§ 371 (c)(1),
(2) Date: Dec. 29, 2020

(87) PCT Pub. No.: WO2020/003794
PCT Pub. Date: Jan. 2, 2020

(65) Prior Publication Data

US 2021/0268822 A1 Sep. 2, 2021

(30) Foreign Application Priority Data

Jun. 29, 2018 (JP) ................................ 2018-123918

(51) Int. Cl.

| | |
|---|---|
| ***B41M 5/42*** | (2006.01) |
| ***B41M 5/44*** | (2006.01) |
| *B41M 5/30* | (2006.01) |
| *B41M 5/323* | (2006.01) |

(52) U.S. Cl.
CPC ................ *B41M 5/42* (2013.01); *B41M 5/44* (2013.01); *B41M 5/305* (2013.01); *B41M 5/323* (2013.01); *B41M 2205/04* (2013.01); *B41M 2205/28* (2013.01); *B41M 2205/40* (2013.01)

(58) Field of Classification Search
CPC ........ B41M 5/305; B41M 5/323; B41M 5/42; B41M 5/44; B41M 2205/04; B41M 2205/28; B41M 2205/40
See application file for complete search history.

(56) References Cited

U.S. PATENT DOCUMENTS 6,352,767 B1 * 3/2002 Kurokawa ........... B41M 7/0027 503/227

FOREIGN PATENT DOCUMENTS

| | | |
|---|---|---|
| CN | 101041308 A | 9/2007 |
| CN | 102016403 A | 4/2011 |
| CN | 102180049 A | 9/2011 |

(Continued)

OTHER PUBLICATIONS

Machine translation of detailed description of JP 2001-277726 acquired on Sep. 7, 2020.*

(Continued)

*Primary Examiner* — Gerard Higgins
(74) *Attorney, Agent, or Firm* — K&L Gates LLP

(57) ABSTRACT

A reversible recording medium according to an embodiment of the present disclosure includes: a recording layer including a leuco pigment as a coloring compound; and a first barrier film that is provided on one surface and a side surface of the recording layer and suppresses mixing of at least one of water or oxygen.

19 Claims, 14 Drawing Sheets

(56) References Cited

FOREIGN PATENT DOCUMENTS

| | | | |
|---|---|---|---|
| JP | 2001-277726 | A | 10/2001 |
| JP | 2003-118242 | A | 4/2003 |
| JP | 2006-007558 | A | 1/2006 |
| JP | 2011-143685 | A | 7/2011 |
| JP | H10-244787 | A | 11/2012 |
| WO | 2018/092488 | A1 | 5/2018 |
| WO | WO-2018092489 | A1 | 5/2018 |

OTHER PUBLICATIONS

Machine translation of detailed description of JP 2006-007558 acquired on Sep. 8, 2020.*

Keller et al. "Water Vapor Permeation in Plastics", 2017, p. 1-29. Acquired on Sep. 7, 2023 from https://www.pnnl.gov/main/publications/external/technical_reports/PNNL-26070.pdf (Year: 2017).*

International Search Report dated Aug. 6, 2019 issued in connection with PCT/JP2019/019457.

* cited by examiner

[ FIG. 1 ]
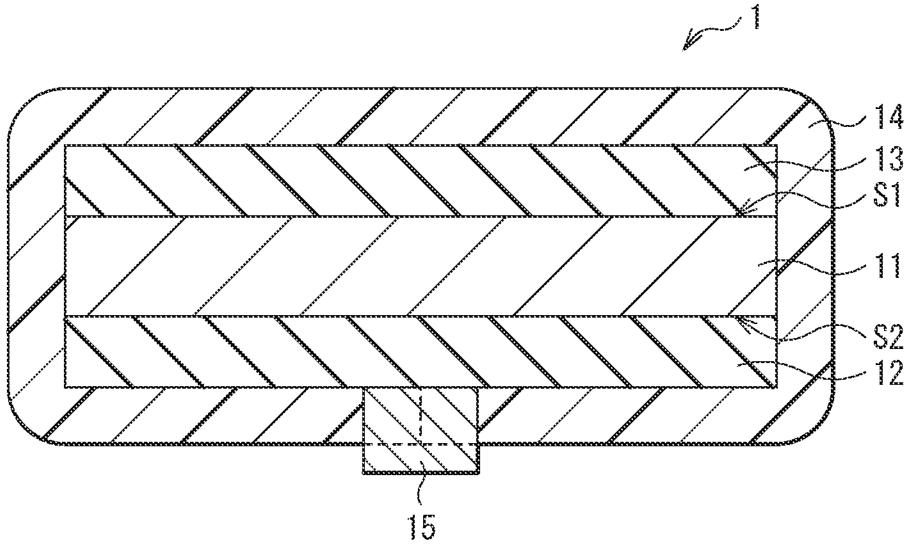
[ FIG. 2 ]
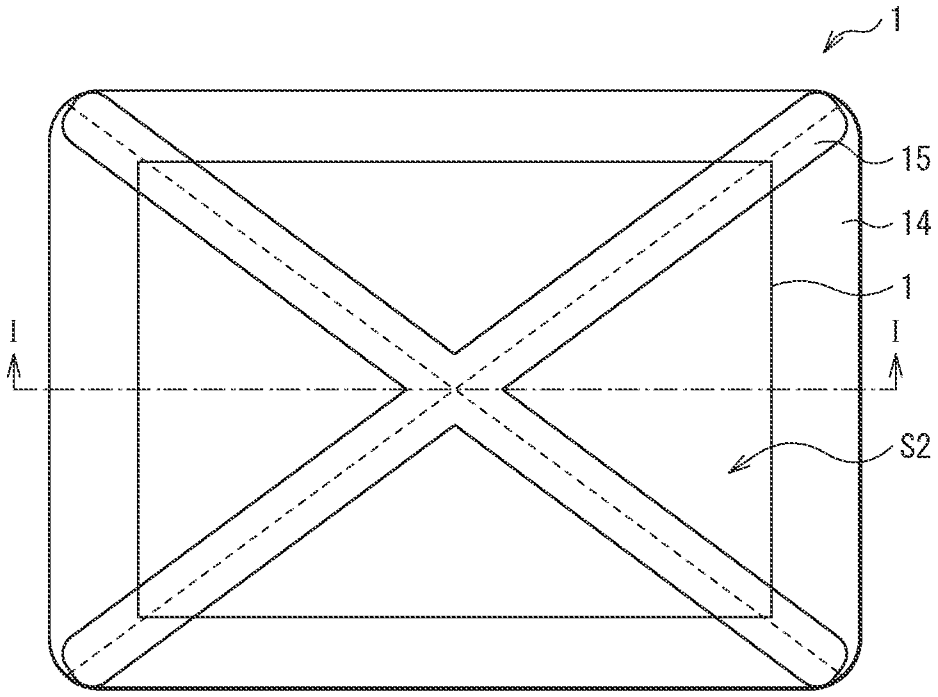

[ FIG. 3 ]
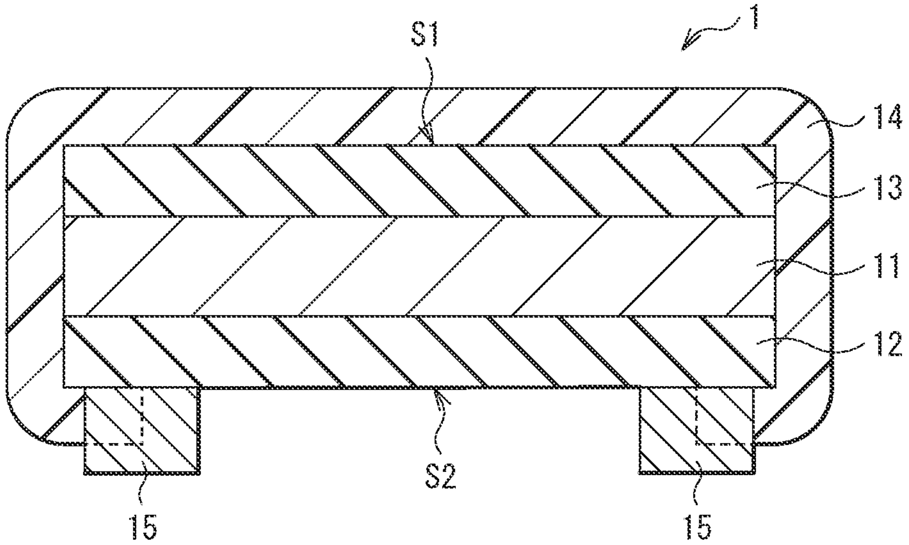
[ FIG. 4 ]
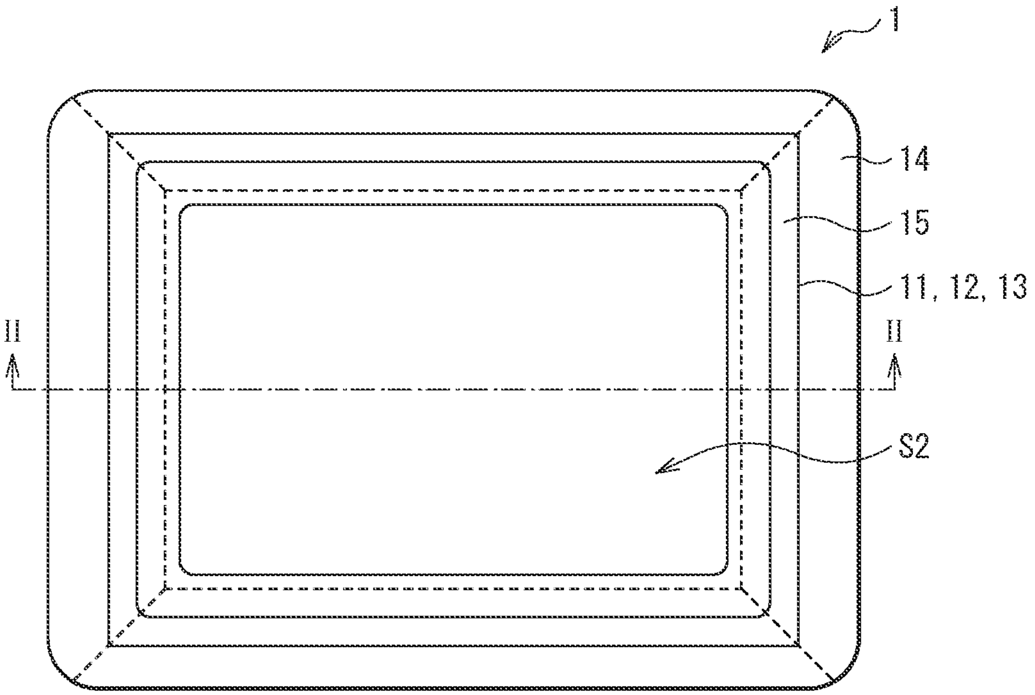

[ FIG. 5 ]
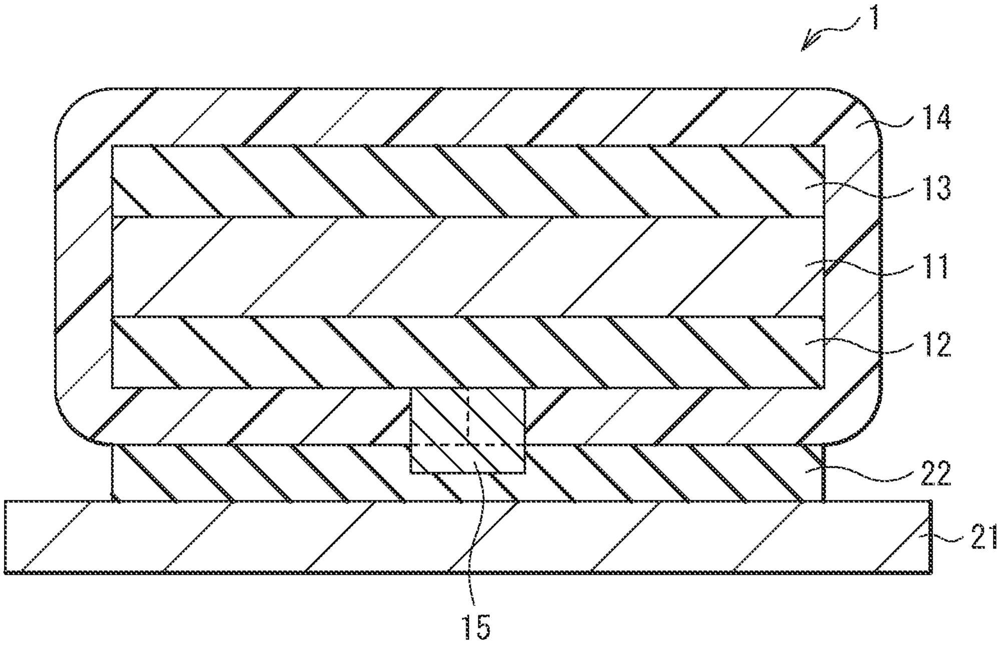
[ FIG. 6 ]
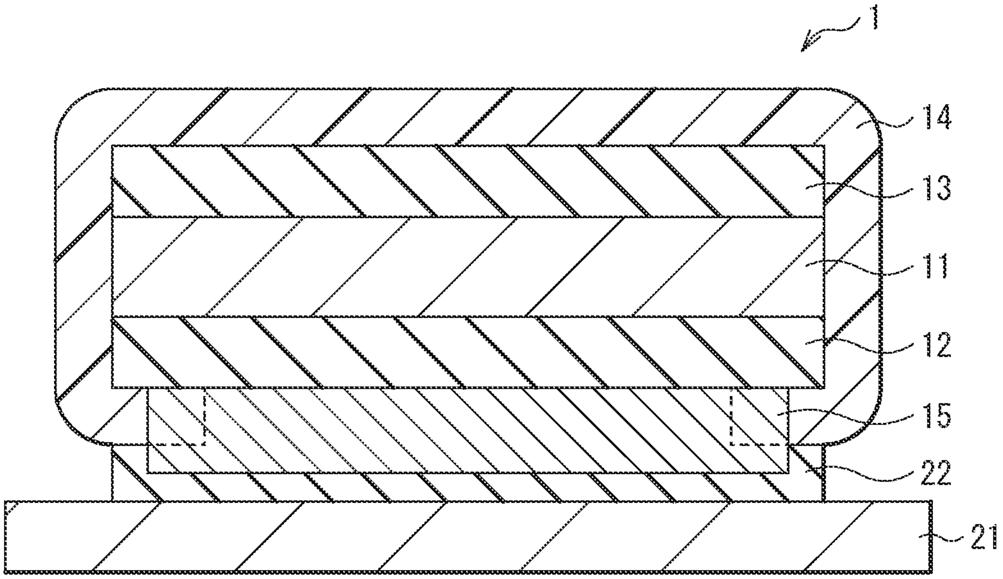

[ FIG. 7 ]
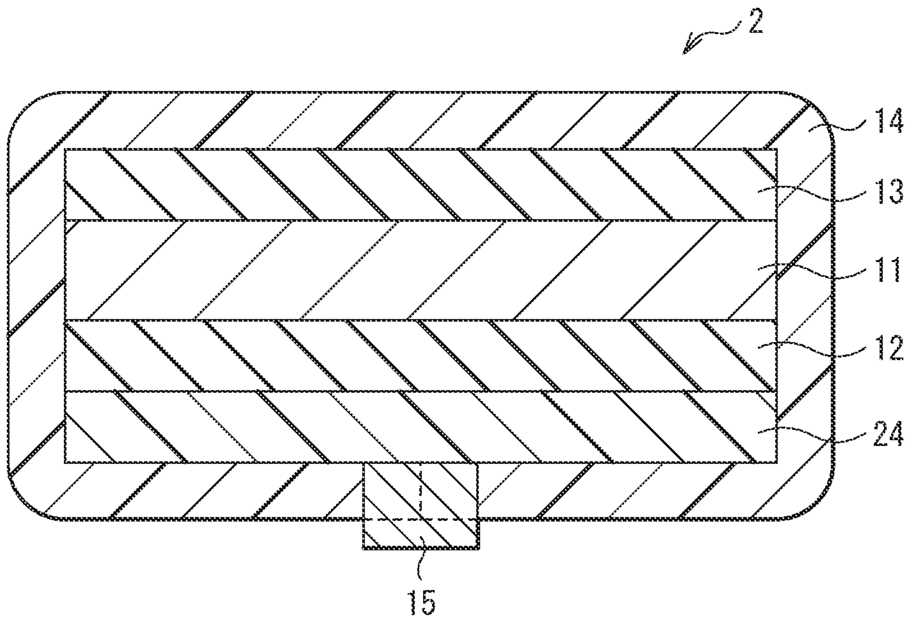
[ FIG. 8 ]
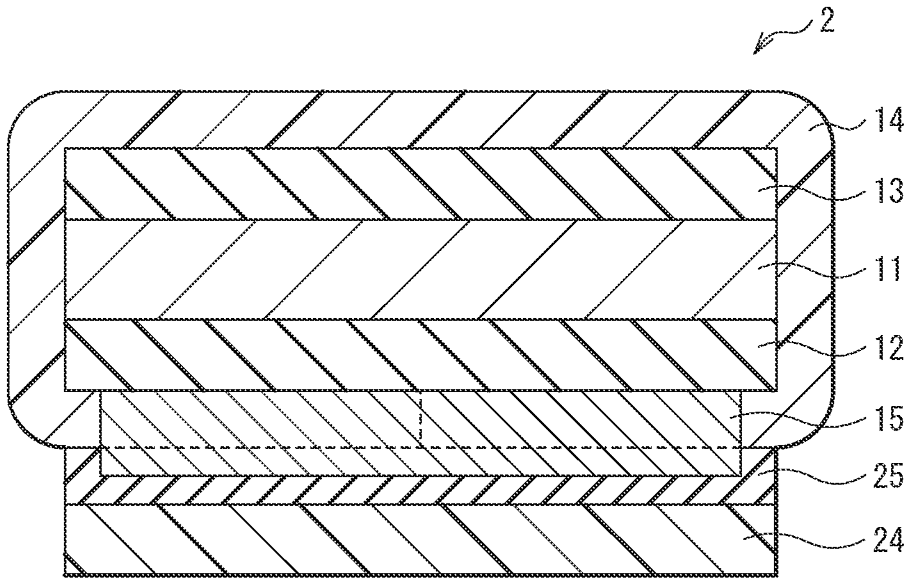

[ FIG. 9 ]
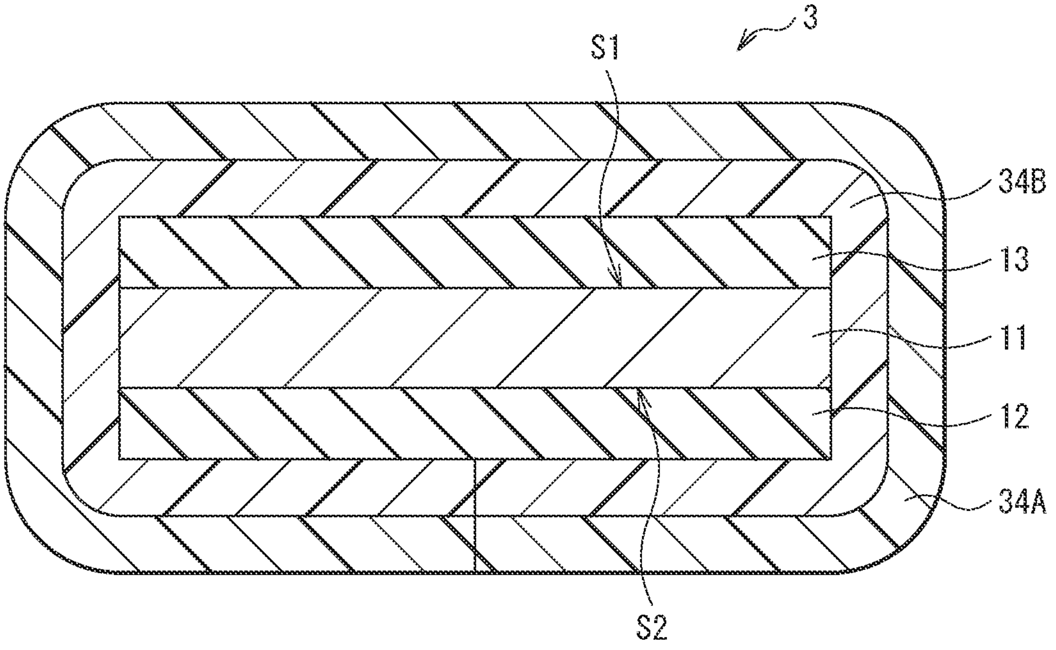
[ FIG. 10 ]
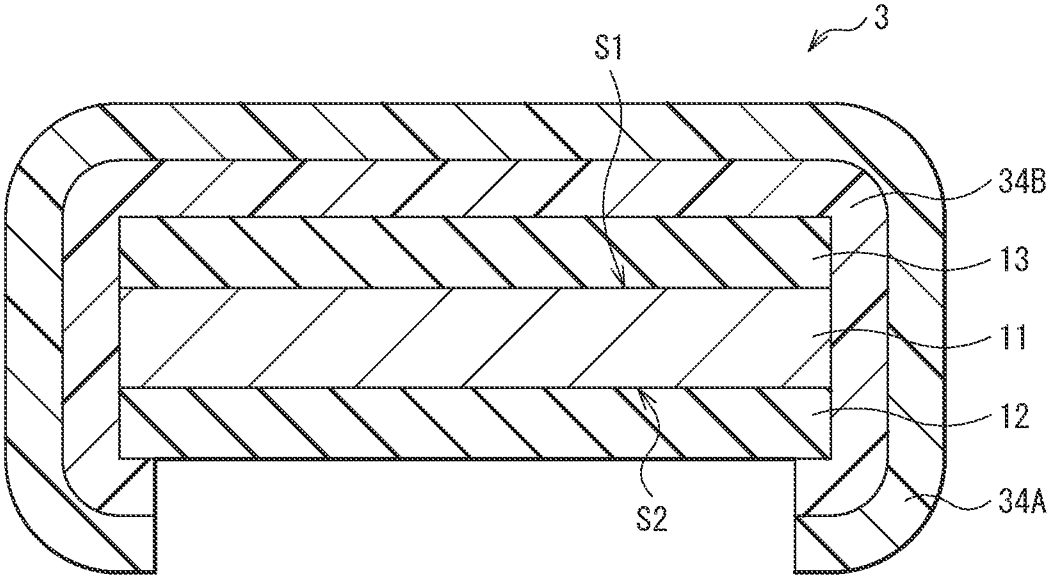

[ FIG. 11 ]
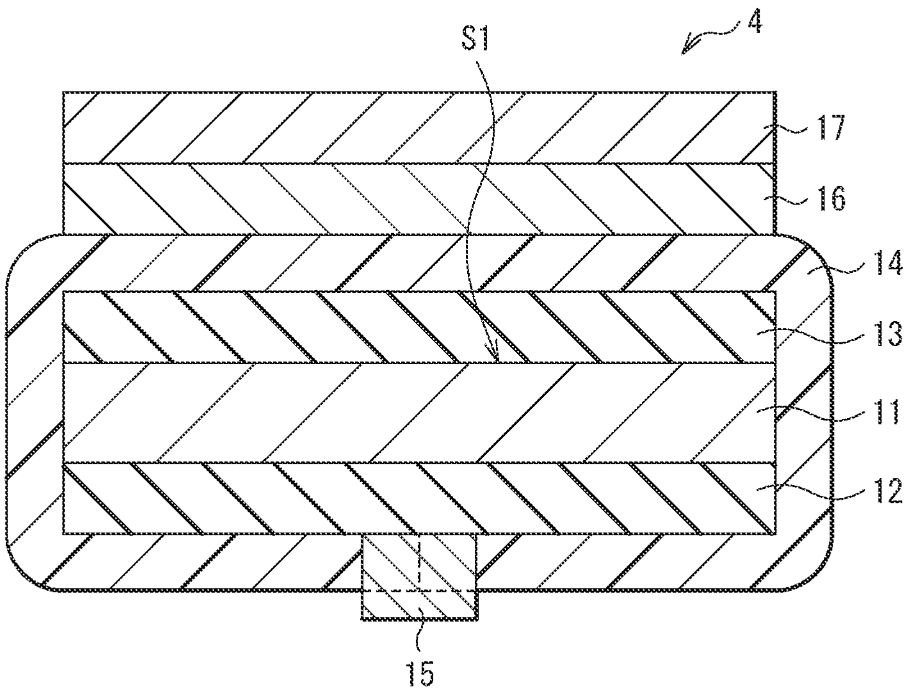
[ FIG. 12 ]
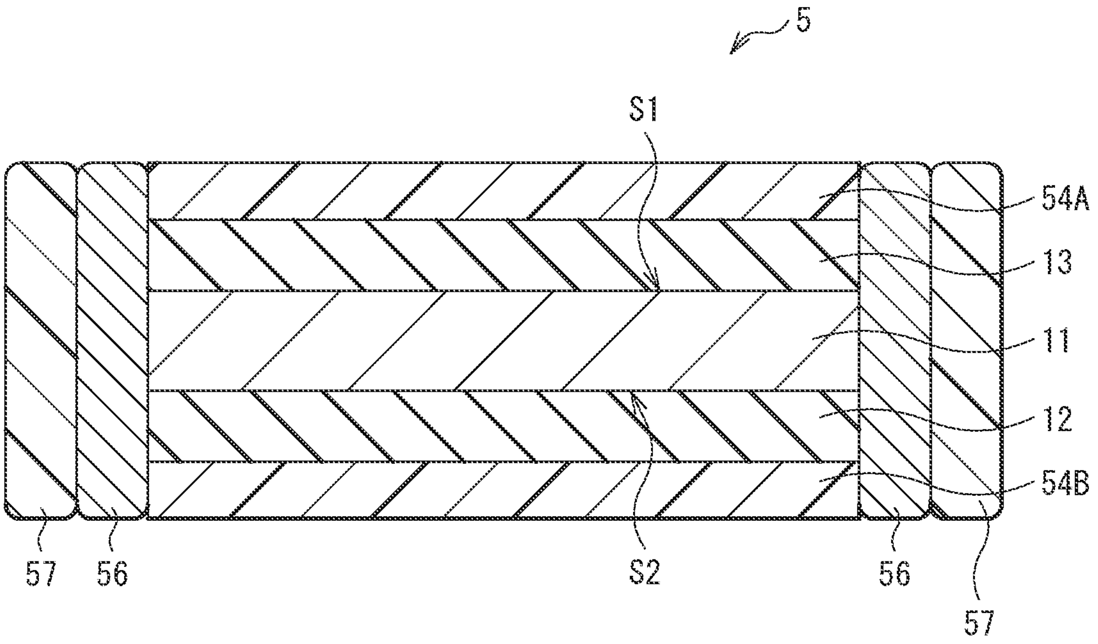

[ FIG. 13 ]
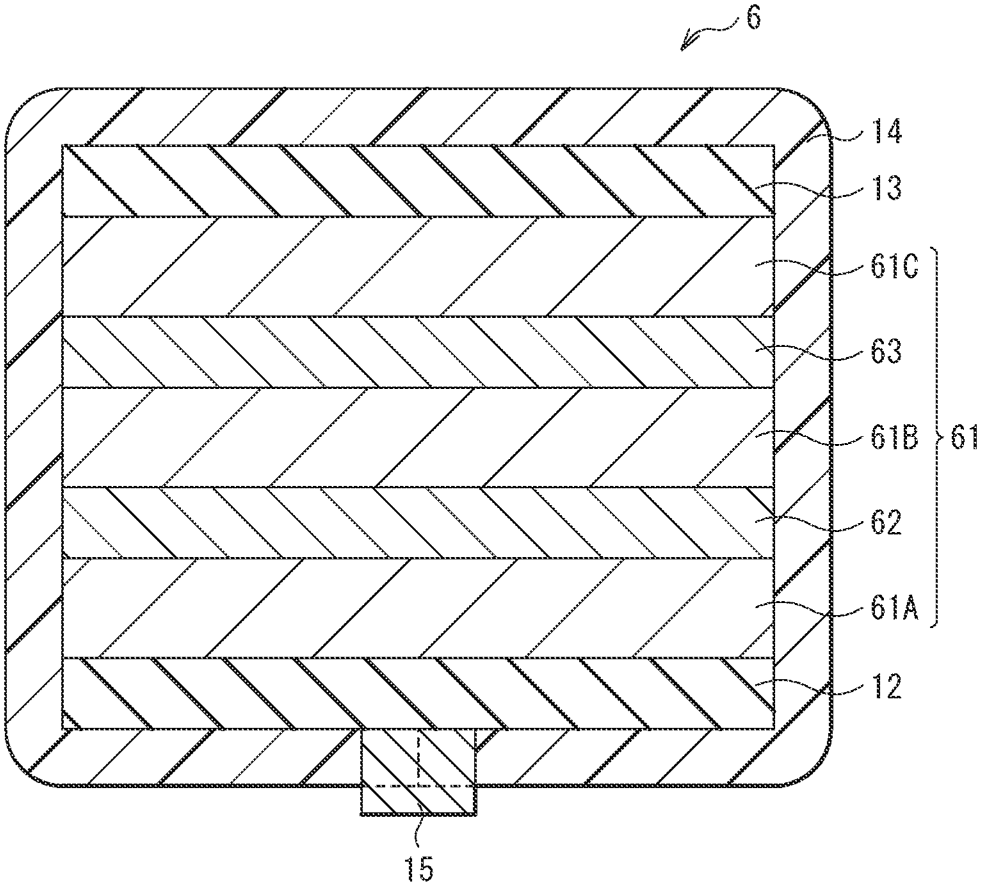

[ FIG. 14 ]
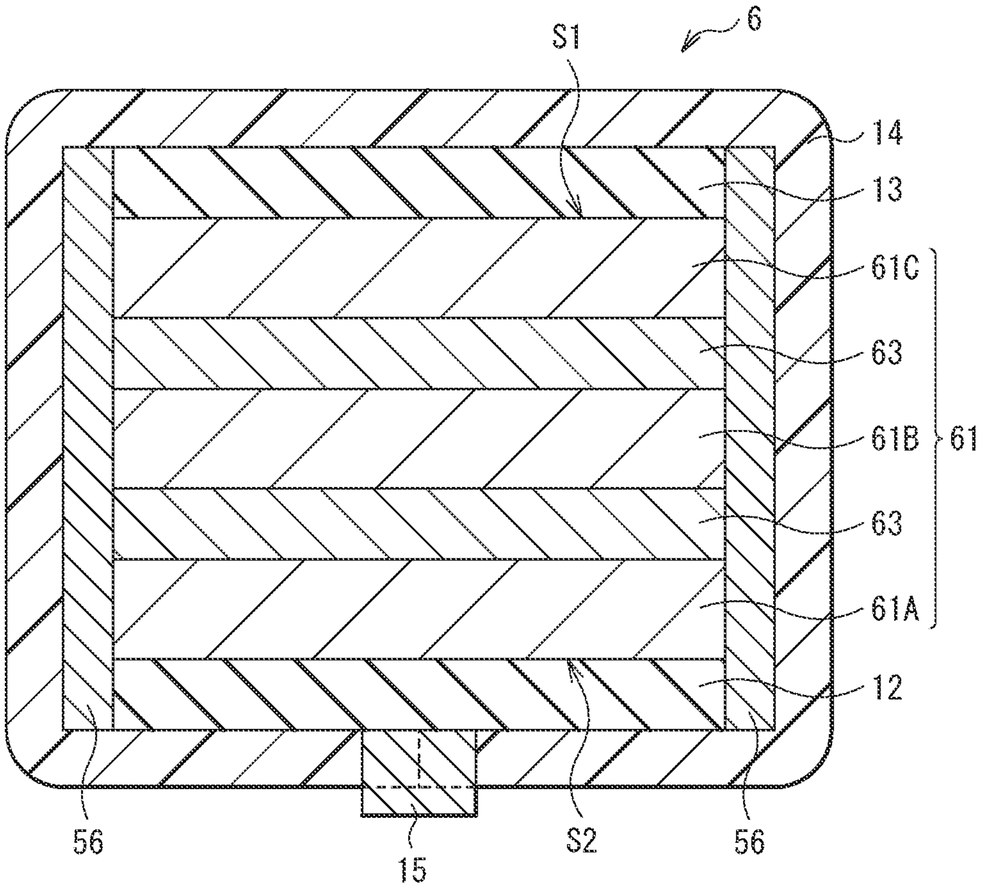
[ FIG. 15 ]
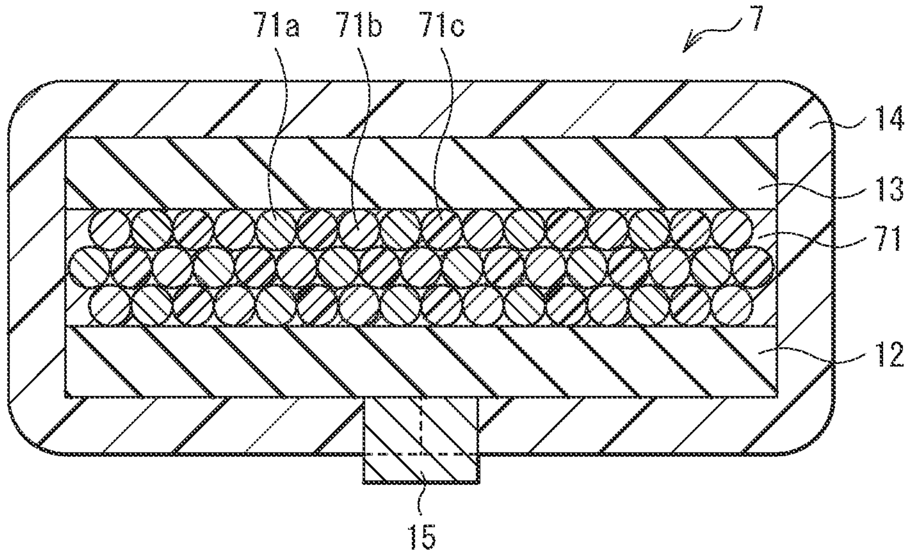

[ FIG. 16A ]
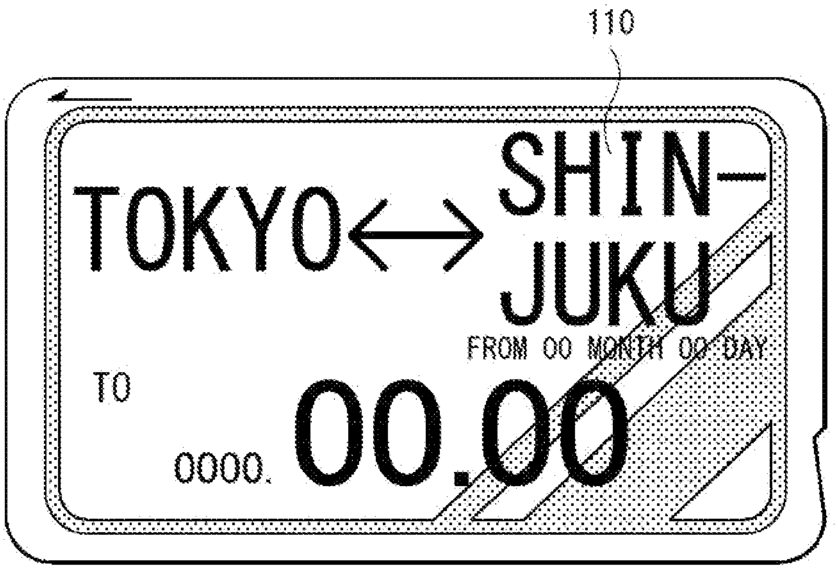
[ FIG. 16B ]
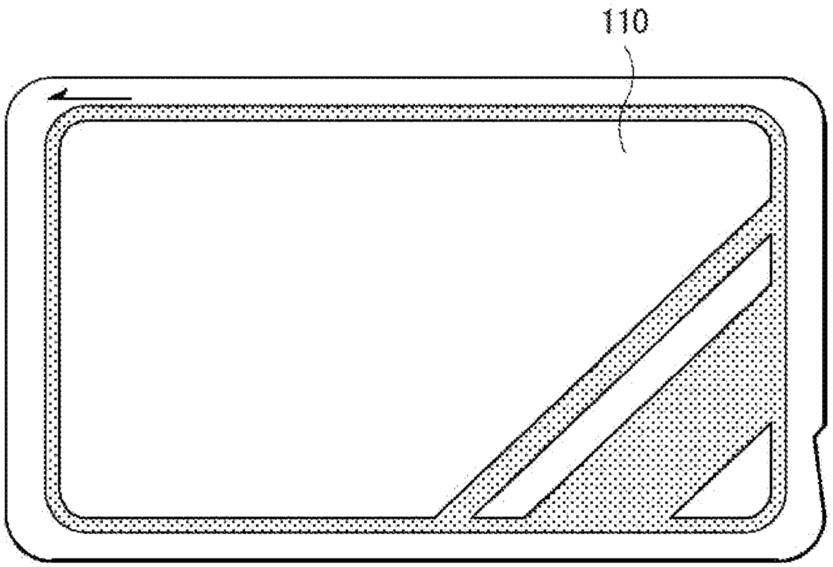

[ FIG. 17A ]
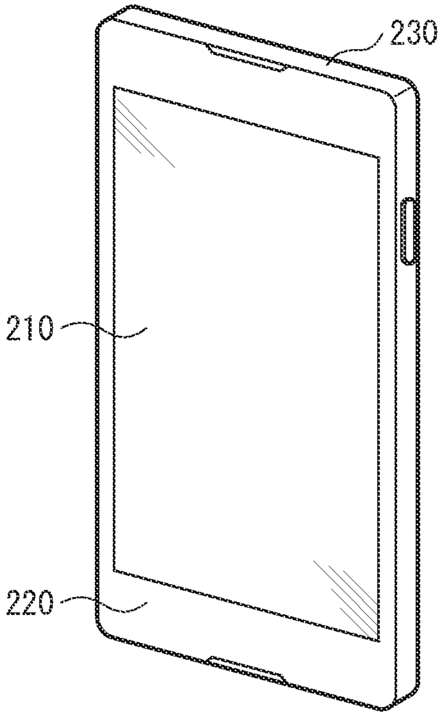
[ FIG. 17B ]
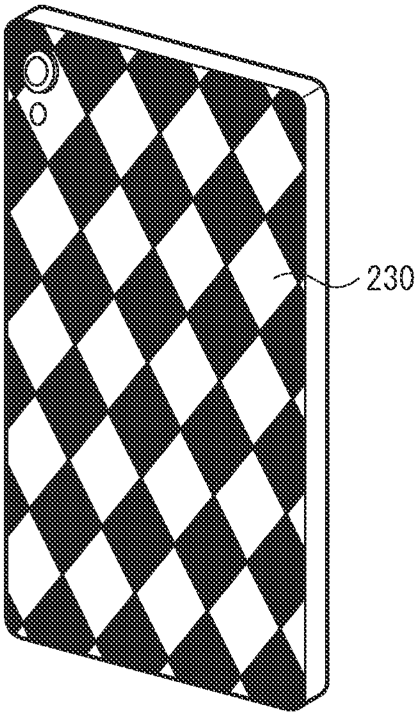

[ FIG. 18A ]
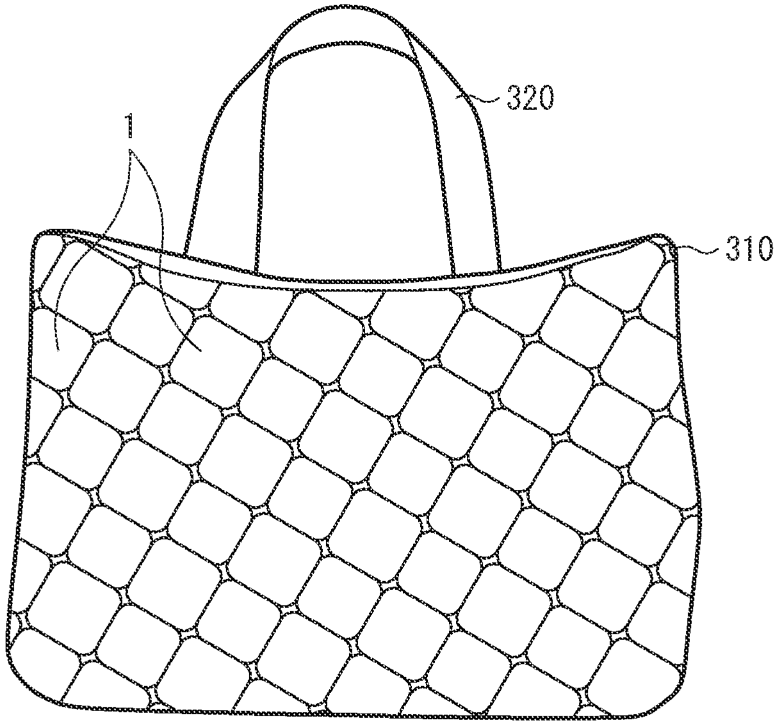
[ FIG. 18B ]

[ FIG. 19 ]
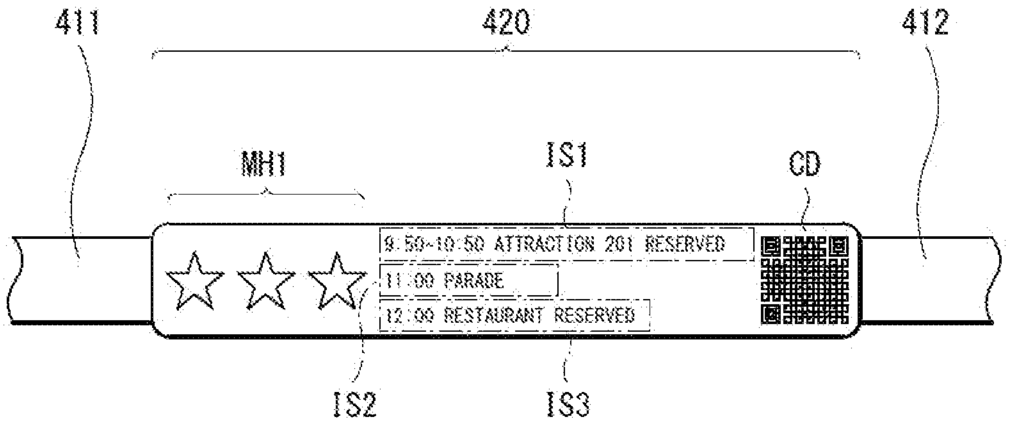

[ FIG. 20A ]
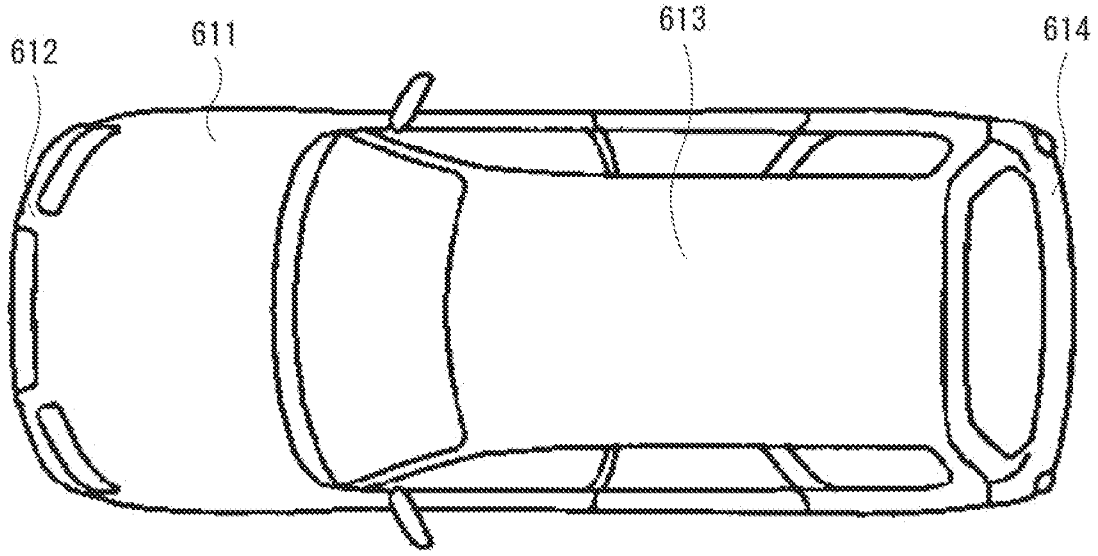
[ FIG. 20B ]
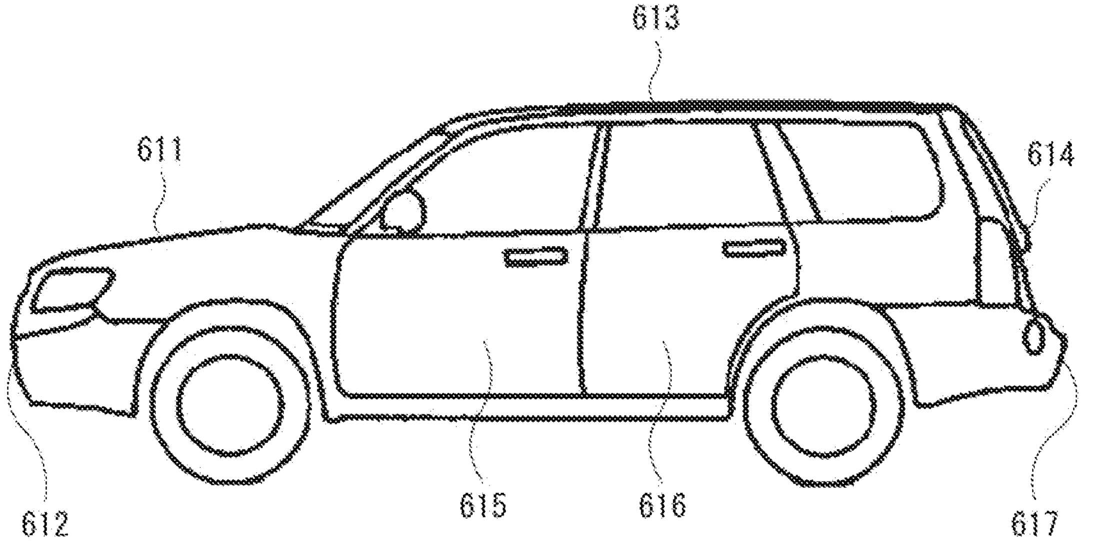

【 FIG. 21 】
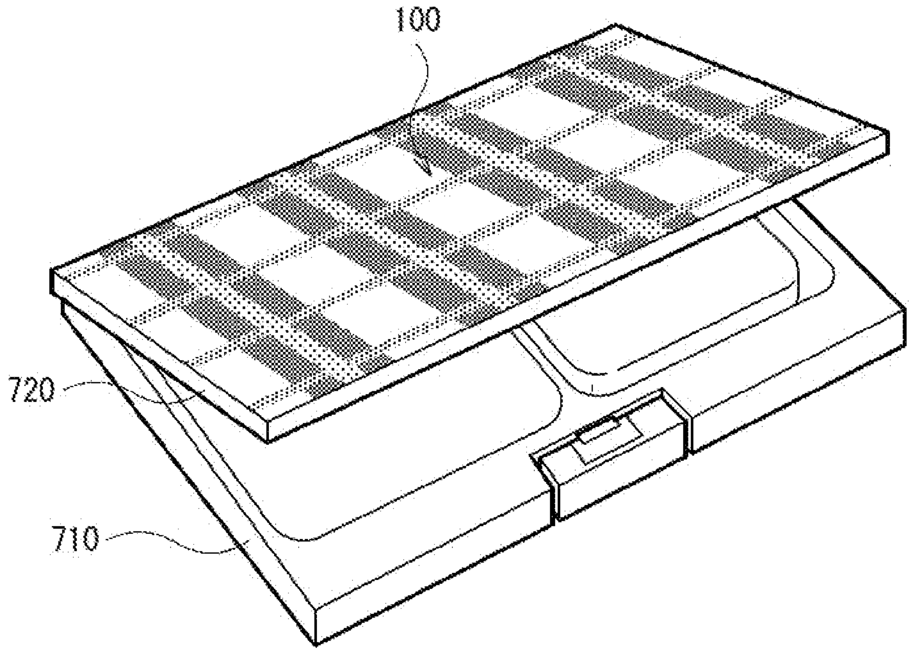

REVERSIBLE RECORDING MEDIUM AND EXTERIOR MEMBER

TECHNICAL FIELD

The present disclosure relates to a reversible recording medium that allows for recording and deletion of, for example, an image, and an exterior member provided therewith.

BACKGROUND ART

Recently, necessity of a rewritable recording technique has been recognized from the viewpoint of global environment. For example, development has been in progress in a recording medium that enables information to be recorded and deleted reversibly by heat, i.e., a so-called reversible recording medium, as an example of a display medium that replaces a printed matter.

As the reversible recording medium, for example, development has been in progress in a reversible recording medium using a leuco pigment as a color developer. The reversible recording medium using the leuco pigment has an issue of a deterioration in display quality caused by mixing of water and an oxygen gas from an end surface. As countermeasures against this issue, for example, PTL 1 discloses a reversible recording medium in which mixing of oxygen is reduced by providing oxygen gas barrier layers on an upper layer side and a lower layer side of the reversible recording medium.

CITATION LIST

Patent Literature

PTL 1: Japanese Unexamined Patent Application Publication No. 2006-7558

SUMMARY OF THE INVENTION

Incidentally, it is possible to use a reversible recording medium as an exterior member. In a case where the reversible recording medium is used as an exterior member of an electronic device or the like, for example, high designability is desired without spoiling an appearance of the electronic device.

It is desirable to provide a reversible recording medium and an exterior member that make it possible to improve durability of display quality and designability.

A reversible recording medium according to an embodiment of the present disclosure includes: a recording layer including a leuco pigment as a coloring compound; and a first barrier film that is provided on one surface and a side surface of the recording layer and suppresses mixing of at least one of water or oxygen.

An exterior member according to an embodiment of the present disclosure is provided with the above-described reversible recording medium according to the embodiment of the present disclosure on at least one surface of a support base.

In the reversible recording medium according to the embodiment of the present disclosure and the exterior member according to the embodiment of the present disclosure, the first barrier film that suppresses mixing of at least one of hydrogen or oxygen is provided on the one surface and the side surface of the recording layer including the leuco pigment. This makes it possible to reduce a non-display region in an outer peripheral part of the recording layer.

According to the reversible recording medium according to the embodiment of the present disclosure and the exterior member according to the embodiment of the present disclosure, the first barrier film that suppresses mixing of at least one of hydrogen or oxygen is provided on the one surface and the side surface of the recording layer including the leuco pigment, which reduces the non-display region in the outer peripheral part of the recording layer. This consequently makes it possible to provide a reversible recording medium having superior durability of display quality and superior designability.

It is to be noted that the effects described here are not necessarily limitative, and may be any of the effects described in the present disclosure.

BRIEF DESCRIPTION OF DRAWINGS

FIG. 1 is a schematic cross-sectional view of an example of a configuration of a reversible recording medium according to an embodiment of the present disclosure.

FIG. 2 is a schematic plan view of a configuration of a rear surface of the reversible recording medium illustrated in FIG. 1.

FIG. 3 is a schematic cross-sectional view of another example of the configuration of the reversible recording medium according to the embodiment of the present disclosure.

FIG. 4 is a schematic plan view of a configuration of a rear surface of the reversible recording medium illustrated in FIG. 3.

FIG. 5 is a schematic cross-sectional view of bonding of the reversible recording medium illustrated in FIG. 1 onto a support base.

FIG. 6 is a schematic cross-sectional view of bonding of the reversible recording medium illustrated in FIG. 3 onto the support base.

FIG. 7 is a schematic cross-sectional view of an example of a configuration of a reversible recording medium according to a modification example 1 of the present disclosure.

FIG. 8 is a schematic cross-sectional view of another example of the configuration of the reversible recording medium according to the modification example 1 of the present disclosure.

FIG. 9 is a schematic cross-sectional view of an example of a configuration of a reversible recording medium according to a modification example 2 of the present disclosure.

FIG. 10 is a schematic cross-sectional view of another example of the configuration of the reversible recording medium according to the modification example 2 of the present disclosure.

FIG. 11 is a schematic cross-sectional view of an example of a configuration of a reversible recording medium according to a modification example 3 of the present disclosure.

FIG. 12 is a schematic cross-sectional view of an example of a configuration of a reversible recording medium according to a modification example 4 of the present disclosure.

FIG. 13 is a schematic cross-sectional view of an example of a configuration of a reversible recording medium according to a modification example 5 of the present disclosure.

FIG. 14 is a schematic cross-sectional view of another example of the configuration of the reversible recording medium according to the modification example 5 of the present disclosure.

FIG. 15 is a schematic cross-sectional view of an example of a configuration of a reversible recording medium according to a modification example 6 of the present disclosure.

FIG. 16A is a perspective view of an example of an appearance of an application example 1.

FIG. 16B is a perspective view of another example of the appearance of the application example 1.

FIG. 17A is a perspective view of an example of an appearance (on front side) of an application example 2.

FIG. 17B is a perspective view of an example of an appearance (on rear side) of the application example 2.

FIG. 18A is a perspective view of an example of an appearance of an application example 3.

FIG. 18B is a perspective view of another example of the appearance of the application example 3.

FIG. 19 is an explanatory diagram illustrating a configuration example of an application example 4.

FIG. 20A is a perspective view of an example of an appearance (an upper surface) of an application example 5.

FIG. 20B is a perspective view of an example of an appearance (a side surface) of the application example 5.

FIG. 21 is a perspective view of an example of an appearance of an application example 6.

MODES FOR CARRYING OUT THE INVENTION

In the following, some embodiments of the present disclosure are described in detail with reference to the drawings. The following description is directed to specific examples of the present disclosure, and the present disclosure is not limited to the following embodiments. In addition, the present disclosure is not limited to the arrangement, dimensions, dimensional ratios, and the like of respective components illustrated in the drawings. It is to be noted that description is given in the following order.

1. Embodiment (An example in which a front surface and a side surface of a recording layer is covered with a barrier film)
    - 1-1. Configuration of Reversible Recording Medium
    - 1-2. Manufacturing Method of Reversible Recording Medium
    - 1-3. Recording and Deletion Methods of Reversible Recording Medium
    - 1-4. Workings and Effects
2. Modification Examples
    - 2-1. Modification Example 1 (An example in which a barrier film is further provided on a rear surface of the recording layer)
    - 2-2. Modification Example 2 (An example using a barrier film having a two-layer structure)
    - 2-3. Modification Example 3 (An example in which a UV absorbing layer and a hard coat layer are further provided on the front surface of the recording layer)
    - 2-4. Modification Example 4 (An example in which a buffer layer is further provided on the side surface of the recording layer)
    - 2-5. Modification Example 5 (An example in which a plurality of recording layers is stacked)
    - 2-6. Modification Example 6 (An example in which a plurality of types of coloring compounds is included in a recording layer)
3. Application Examples
4. Working Examples

1. EMBODIMENT

FIG. 1 schematically illustrates an example of a cross-sectional configuration of a reversible recording medium (a reversible recording medium 1) according to an embodiment of the present disclosure. FIG. 2 schematically illustrates a planar configuration on a rear surface (a surface S2) side of the reversible recording medium illustrated in FIG. 1, and FIG. 1 illustrates a cross-section taken along a line I-I illustrated in FIG. 2. The reversible recording medium 1 includes a recording layer 11 that includes a leuco pigment and has a front surface (a surface S1), a side surface, and the rear surface (the surface S2) covered with a barrier film 14 (a first barrier film).

1-1. Configuration of Reversible Recording Medium

The reversible recording medium 1 according to the present embodiment includes the recording layer 11 having the front surface (the surface S1), the side surface, and the rear surface (the surface S2) covered with the barrier film 14, as described above. Pressure-sensitive adhesive layers 12 and 13 are further provided on the surface S2 and the surface S1 of the recording layer 11, respectively, and the barrier film 14 is bonded to the recording layer 11 with these pressure-sensitive adhesive layers 12 and 13 interposed therebetween. The barrier film 14 covers the recording layer 11 from the front surface (the surface S1) to the rear surface (the surface S2), and has a configuration in which end parts of the barrier film 14 are sealed by a sealant 15 on the rear surface (the surface S2) on diagonal lines of the recording layer 11, for example.

The recording layer 11 enables information to be recorded and deleted reversibly by heat. The recording layer 11 is configured using a material that allows for stable repeated recording and allows for control of a decolored state and a color-developed state. Specifically, the recording layer 11 is formed by dispersing a coloring compound, a color developing/quenching agent, and a photothermal conversion agent in, for example, a macromolecular material. A film thickness (hereinafter, simply referred to as thickness) of the recording layer 11 is 1 μm or more and 10 μm or less, for example.

As the coloring compound, for example, a leuco pigment is used. Examples of the leuco pigment include an existing pigment for heat-sensitive paper. A specific example thereof includes a compound that contains, in a molecule, a group having an electron-donating property and is represented by the following formula (1).

[Chem. 1]

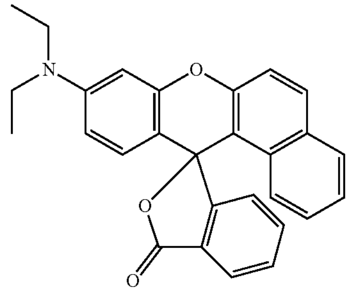

(2)

The coloring compound is not particularly limited, and is appropriately selectable in accordance with a purpose. Specific examples of the coloring compound include, in addition to the compound represented by the above-described formula (1), a fluoran-based compound, a triphenylmethane phthalide-based compound, an azaphthalide-based compound, a phenothiazine-based compound, a leuco auramine-based compound, an indolinophthalide-based compound, and the like. Other examples include 2-anilino-3-methyl-6-diethylaminofluoran, 2-anilino-3-methyl-6-di(n-butylamino)fluoran, 2-anilino-3-methyl-6-(N-n-propyl-N-methylamino)fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-sec-butyl-N-methylamino)fluoran, 2-anilino-3-methyl-6-(N-n-amyl-N-ethylamino)fluoran, 2-anilino-3-methyl-6-(N-iso-amyl-N-ethylamino)fluoran, 2-anilino-3-methyl-6-(N-n-propyl-N-isopropylamino)fluoran, 2-anilino-3-methyl-6-(N-cyclohexyl-N-methylamino)fluoran, 2-anilino-3-methyl-6-(N-ethyl-p-toluidino)fluoran, 2-anilino-3-methyl-6-(N-methyl-p-toluidino)fluoran, 2-(m-trichloromethylanilino)-3-methyl-6-diethylaminofluoran, 2-(m-trifluoromethylanilino)-3-methyl-6-diethylaminofluoran, 2-(m-trichloromethylanilino)-3-methyl-6-(N-cyclohexyl-N-methylamino)fluoran, 2-(2,4-dimethylanilino)-3-methyl-6-diethylaminofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-anilino-6-(N-n-hexyl-N-ethylamino)fluoran, 2-(o-chloroanilino)-6-diethylaminofluoran, 2-(o-chloroanilino)-6-dibutylaminofluoran, 2-(m-trifluoromethylanilino)-6-diethylaminofluoran, 2,3-dimethyl-6-dimethylaminofluoran, 3-methyl-6-(N-ethyl-p-toluidino)fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo-6-cyclohexylaminofluoran, 2-chloro-6-(N-ethyl-N-isoamylamino)fluoran, 2-chloro-3-methyl-6-diethylaminofluoran, 2-anilino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3-chloro-6-diethylaminofluoran, 1,2-benzo-6-diethylaminofluoran, 3-diethylamino-6-(m-trifluoromethylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-octyl-2-methylindole-3-yl)-3-(2-ethoxy-4-diethylaminophenyl)-4-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3,3-bis(2-ethoxy-4-diethylaminophenyl)-4-azaphthalide, 3,3-bis(2-ethoxy-4-diethylaminophenyl)-7-azaphthalide, 2-(p-acetylanilino)-6-(N-n-amyl-N-n-butylamino)fluoran, 2-benzylamino-6-(N-ethyl-p-toluidino)fluoran, 2-benzylamino-6-(N-methyl-2,4-dimethylanilino)fluoran, 2-benzylamino-6-(N-ethyl-2,4-dimethylanilino)fluoran, 2-benzylamino-6-(N-methyl-p-toluidino)fluoran, 2-benzylamino-6-(N-ethyl-p-toluidino)fluoran, 2-(di-p-methylbenzylamino)-6-(N-ethyl-p-toluidino)fluoran, 2-(α-phenylethylamino)-6-(N-ethyl-p-toluidino)fluoran, 2-methylamino-6-(N-methylanilino)fluoran, 2-methylamino-6-(N-ethylanilino)fluoran, 2-methylamino-6-(N-propylanilino)fluoran, 2-ethylamino-6-(N-methyl-p-toluidino)fluoran, 2-methylamino-6-(N-methyl-2,4-dimethylanilino)fluoran, 2-ethylamino-6-(N-ethyl-2,4-dimethylanilino)fluoran, 2-dimethylamino-6-(N-methylanilino)fluoran, 2-dimethylamino-6-(N-ethylanilino)fluoran, 2-diethylamino-6-(N-methyl-p-toluidino)fluoran, 2-diethylamino-6-(N-ethyl-p-toluidino)fluoran, 2-dipropylamino-6-(N-methylanilino)fluoran, 2-dipropylamino-6-(N-ethylanilino)fluoran, 2-amino-6-(N-methylanilino)fluoran, 2-amino-6-(N-ethylanilino)fluoran, 2-amino-6-(N-propylanilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethylanilino)fluoran, 2-amino-6-(N-ethyl-p-ethylanilino)fluoran, 2-amino-6-(N-propyl-p-ethylanilino)fluoran, 2-amino-6-(N-methyl-2,4-dimethylanilino)fluoran, 2-amino-6-(N-ethyl-2,4-dimethylanilino)fluoran, 2-amino-6-(N-propyl-2,4-dimethylanilino)fluoran, 2-amino-6-(N-methyl-p-chloroanilino)fluoran, 2-amino-6-(N-ethyl-p-chloroanilino)fluoran, 2-amino-6-(N-propyl-p-chloroanilino)fluoran, 1,2-benzo-6-(N-ethyl-N-isoamylamino)fluoran, 1,2-benzo-6-dibutylaminofluoran, 1,2-benzo-6-(N-methyl-N-cyclohexylamino)fluoran, 1,2-benzo-6-(N-ethyl-N-toluidino)fluoran, and the like. For the recording layer 11, as the coloring compound, one of the above-described compounds may be used alone, or two or more of the above-described compounds may be used in combination.

The color developing/quenching agent serves, for example, to develop a color of a colorless coloring compound or to decolor a coloring compound colored in a predetermined color. Examples of the color developing/quenching agent include a phenol derivative, a salicylic acid derivative, a urea derivative, and the like. Specific examples thereof include a compound having a salicylic acid skeleton represented by the following general formula (2) and containing, in a molecule, a group having an electron-accepting property.

[Chem. 2]

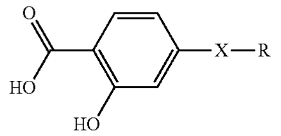

(2)

(X is one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—, and R is a linear hydrocarbon group having 25 to 34 carbon atoms.)

Other examples of the color developing/quenching agent include 4,4'-isopropylidenebisphenol, 4,4'-isopropylidenebis(o-methylphenol), 4,4'-secondary butylidenebisphenol, 4,4'-isopropylidenebis(2-tertiary butylphenol), zinc p-nitrobenzoate, 1,3,5-tris(4-tertiarybutyl-3-hydroxy-2,6-dimethylbenzyl)isocyanuric acid, 2,2-(3,4'-dihydroxydiphenyl)propane, bis(4-hydroxy-3-methylphenyl)sulfide, 4-{β-(p-methoxyphenoxy)ethoxy}salicylic acid, 1,7-bis(4-hydroxyphenylthio)-3,5-dioxaheptane, 1,5-bis(4-hydroxyphenylthio)-5-oxapentane, phthalic acid monobenzyl ester monocalcium salt, 4,4'-cyclohexylidenediphenol, 4,4'-isopropylidenebis(2-chlorophenol), 2,2'-methylenebis(4-methyl-6-tertiary-butylphenol), 4,4'-butylidenebis(6-tertiary-butyl-2-methyl)phenol, 1,1,3-tris(2-methyl-4-hydroxy-5-tertiary-butylphenyl)butane, 1,1,3-tris (2-methyl-4-hydroxy-5-cyclohexylphenyl)butane, 4,4'-thiobis(6-tertiary-butyl-2-methyl)phenol, 4,4'-diphenolsulfone, 4-isopropoxy-4'-hydroxydiphenylsulfone (4-hydroxy-4'-isopropoxydiphenylsulfone), 4-benzyloxy-4'-hydroxydiphenylsulfone, 4,4'-diphenolsulfoxide, isopropyl p-hydroxybenzoate, benzyl p-hydroxybenzoate, benzyl protocatechuate, stearyl gallate, lauryl gallate, octyl gallate, 1,3-bis(4-hydroxyphenylthio)-propane, N,N'-diphenylthiourea, N,N'-di(m-chlorophenyl)thiourea, salicylanilide, bis (4-hydroxyphenyl)methyl acetate, bis(4-hydroxyphenyl) benzyl acetate, 1,3-bis(4-hydroxycumyl)benzene, 1,4-bis(4-hydroxycumyl)benzene, 2,4'-diphenolsulfone, 2,2'-diallyl-4, 4'-diphenolsulfone, 3,4-dihydroxyphenyl-4'-methyldiphenylsulfone, zinc 1-acetyloxy-2-naphthoate, zinc 2-acetyloxy-1-naphthoate, zinc 2-acetyloxy-3-naphthoate, $\alpha,\alpha$-bis(4-hydroxyphenyl)-$\alpha$-methyltoluene, an antipyrine complex of zinc thiocyanate, tetrabromobisphenol A, tetrabromobisphenol S, 4,4'-thiobis(2-methylphenol), 4,4'-thiobis(2-chlorophenol), dodecylphosphonic acid, tetradecylphosphonic acid, hexadecylphosphonic acid, octadecylphosphonic acid, eicosylphosphonic acid, docosylphosphonic acid, tetracosylphosphonic acid, hexacosylphosphonic acid, octacosylphosphonic acid, $\alpha$-hydroxydodecylphosphonic acid, $\alpha$-hydroxytetradecylphosphonic acid, $\alpha$-hydroxyhexadecylphosphonic acid, $\alpha$-hydroxy octadecylphosphonic acid, $\alpha$-hydroxyeicosylphosphonic acid, $\alpha$-hydroxydocosylphosphonic acid, $\alpha$-hydroxytetracosylphosphonic acid, dihexadecyl phosphate, dioctadecyl phosphate, dieicosyl phosphate, didocosyl phosphate, monohexadecyl phosphate, monooctadecyl phosphate, monoeicosyl phosphate, monodocosyl phosphate, methylhexadecyl phosphate, methyloctadecyl phosphate, methyleicosyl phosphate, methyldocosyl phosphate, amylhexadecyl phosphate, octylhexadecyl phosphate, laurylhexadecyl phosphate, and the like. For the recording layer 11, as the color developing/quenching agent, one of the above-described compounds may be used alone, or two or more of the above-described compounds may be used in combination.

The photothermal conversion agent serves, for example, to absorb light in a predetermined wavelength region of a near infrared region to generate heat. As the photothermal conversion agent, for example, it is preferable to use an near infrared absorbing pigment that has an absorption peak in a wavelength range of 700 nm or more and 2000 nm or less and hardly has absorption in a visible region. Specific examples thereof include a compound having a phthalocyanine skeleton (a phthalocyanine-based pigment), a compound having a naphthalocyanine skeleton (a naphthalocyanine-based pigment), a compound having a squarylium skeleton (a squarylium-based pigment), a metal complex such as a dithio complex, a diimonium salt, an aminium salt, an inorganic compound, and the like. Examples of the inorganic compound include graphite, carbon black, metal powder particles, cobalt tetraoxide, iron oxide, chromium oxide, copper oxide, titanium black, a metal oxide such as ITO, a metal nitride such as niobium nitride, a metal carbide such as tantalum carbide, a metal sulfide, various types of magnetic powder, and the like. Aside from those described above, a compound having a cyanine skeleton (a cyanine-based pigment) with superior light resistance and superior heat resistance may be used.

As used herein, the superior light resistance refers to not decomposing during laser irradiation. The superior heat resistance means that a change equal to or more than 20% does not occur to a maximum absorption peak value of an absorption spectrum when being formed as a film together with a macromolecular material, for example, and being stored at 150° C. for 30 minutes, for example. Examples of such a compound having a cyanine skeleton include a compound containing, in a molecule, one or both of a counter ion of one of $SbF_6$, $PF_6$, $BF_4$, $ClO_4$, $CF_3SO_3$ and $(CF_3SO_3)_2N$ and a methine chain containing a five-membered ring or a six-membered ring.

Although the cyanine-based pigment is preferably provided with both of one of the above-described counter ions and a ring structure such as a five-membered ring and a six-membered ring in a methine chain, the provision of at least one of those allows sufficient light resistance and heat resistance to be secured. A material with superior light resistance and superior heat resistance does not decompose during laser irradiation, as described above. Examples of a way to confirm the superior light resistance include a method of measuring a peak change in an absorption spectrum at the time of a xenon lamp irradiation test. In a case where a change rate is 20% or less at the time of irradiation for 30 minutes, it is possible to judge that light resistance is favorable. Examples of a way to confirm the superior heat resistance include a method of measuring a peak change in an absorption spectrum at the time of storing at 150° C. In a case where a change rate is 20% or less after the 30-minute test, it is possible to judge that heat resistance is favorable.

As the macromolecular material, a material in which the coloring compound, the color developing/quenching agent, and the photothermal conversion agent are easily dispersed evenly is preferable. In addition, the macromolecular material preferably has high transparency to achieve high visibility of information to be written to the recording layer 11, and preferably has high solubility in an organic solvent. Examples of the macromolecular material include a thermosetting resin and a thermoplastic resin. Specific examples thereof include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, polyvinyl alcohol, modified polyvinyl alcohol, hydroxy ethyl cellulose, carboxymethyl cellulose, starch, and the like.

The recording layer 11 includes at least one of the above-described coloring compounds, at least one of the color developing/quenching agents, and at least one of the photothermal conversion agents. It is preferable for the coloring compound and the color developing/quenching agent included in the recording layer 11 to have a ratio between the coloring compound and the color developing/quenching agent being equal to 1:2 (weight ratio), for example. The photothermal conversion agent is changed depending on the film thickness of the recording layer 11. Further, the recording layer 11 may include, in addition to the above-described materials, various additives such as a sensitizer and an ultraviolet absorbing agent, for example.

The pressure-sensitive adhesive layers 12 and 13 serve, for example, to bond the recording layer 11 and the barrier film 14 covering, for example, the entirety of the recording layer 11 to each other, and the pressure-sensitive adhesive layer 12 and the pressure-sensitive adhesive layer 13 are respectively provided on the rear surface (the surface S2) side of the recording layer 11 and the front surface (the surface S1) side of the recording layer 11. The pressure-sensitive adhesive layers 12 and 13 preferably have high transparency to achieve high visibility of information to be written to the recording layer 11, and preferably have high solubility in an organic solvent, for example, similarly to the macromolecular material included in the recording layer 11. Examples of materials of the pressure-sensitive adhesive layers 12 and 13 include pressure-sensitive adhesives such as acrylic-based, urethane-based, epoxy-based, and silicone-based pressure-sensitive adhesives. These pressure-sensitive adhesive layers may be provided on both surfaces of a base such as PET as a supporting body, or may include only a pressure-sensitive adhesive without the base. Alternatively, these pressure-sensitive adhesive layers in a sheet shape may be bonded, or a material dissolved in an organic solvent may be applied, and thereafter dried to form the pressure-sensitive adhesive layers.

The barrier film 14 serves to suppress mixing of one or both of water and oxygen into the recording layer 11, and covers the entirety of the recording layer 11, for example. The barrier film 14 has a rectangular shape, for example, and continuously covers the recording layer 11 having a rectangular shape, for example, from the front surface (the surface S1) to the side surface and the rear surface (the surface S2), and four sides that are end parts of the barrier film 14 are sealed to each other by the sealant 15 on the rear surface (the surface S2) on the diagonal lines of the recording layer 11, as illustrated in FIGS. 1 and 2.

The barrier film 14 preferably has a water vapor transmission rate of 0.001 $g/m^2$/day or more and 10 $g/m^2$/day or less, and preferably has high transparency to achieve high visibility of information to be written to the recording layer 11, similarly to the macromolecular material included in the recording layer 11 and the pressure-sensitive adhesive layers 12 and 13. Such a barrier film 14 includes a laminated film in which an inorganic oxide film is provided on a base including a plastic film. The barrier film 14 configured as a laminated film including the plastic film and the inorganic oxide film covers the recording layer 11, for example, to cause the inorganic oxide film and the plastic film to be respectively provided on the recording layer 11 side (an inner side) and an outer side.

It is possible to use an industrial plastic film, for example, for the plastic film as the base, and the plastic film is preferably formed using at least one of polyethylene terephthalate (PET), polycarbonate (PC), or polymethyl methacrylate (PMMA), for example. The plastic film preferably has a thickness of 5 μm or more and 100 μm or less, for example.

The inorganic oxide film preferably uses, for example, a single-layer film or a laminated film using at least one of a silicon oxide film (an $SiO_x$ film), an aluminum oxide film (an $AlO_x$ film), or a silicon nitride film ($SiN_x$ film) formed using, for example, a sputtering method, a chemical vapor deposition (CVD) method, or the like. The barrier film 14 preferably has, for example, a thickness of 10 nm or more and 1 μm or less.

The sealant 15 serves to seal the end parts of the barrier film 14 to each other. It is possible to use, for example, a thermosetting resin as the sealant 15.

It is to be noted that the barrier film 14 may not necessarily cover the entirety of the recording layer 11, and it is sufficient if the barrier film 14 covers at least the front surface (the surface S1) and the side surface of the recording layer 11. In this case, end parts of the barrier film 14 are sealed by the sealant 15 in an outer peripheral part of the recording layer 11 on the rear surface (the surface S2) side (specifically, the pressure-sensitive adhesive layer 12), for example, as illustrated in FIG. 4.

As described in detail later, the reversible recording medium 1 is usable as a decorative member (an exterior member) of an electronic apparatus such as a wearable terminal, a wearable display, and a portable device, a building, or the like. In this case, the reversible recording medium 1 may be bonded onto the support base 21 with a pressure-sensitive adhesive layer 22 interposed therebetween, for example, as illustrated in FIG. 5. The support base 21 is a casing of the electronic apparatus, for example. The pressure-sensitive adhesive layer 22 may use any of the materials of the above-described pressure-sensitive adhesive layers 12 and 13, for example. It is to be noted that in a case where the support base 21 includes a member through which water and oxygen are transmitted, the reversible recording medium 1 in which the barrier film 14 is sealed in an outer peripheral part of the rear surface (the surface S2) of the recording layer 11 illustrated in FIGS. 3 and 4 may be used. In this case, as illustrated in FIG. 6, to secure flatness of the front surface of the reversible recording medium 1, the sealant 15 that seals the barrier film 14 in the outer peripheral part of the surface S2 of the recording layer 11 may be applied onto the entire surface S2 of the recording layer 11. In addition, as long as the support base 21 includes a base having high visibility such as glass and a highly transparent resin plate, the support base 21 may be configured to become a forefront surface of any of various application apparatuses.

1-2. Manufacturing Method of Reversible Recording Medium

The reversible recording medium 1 according to the present embodiment may be manufactured using an application method, for example. It is to be noted that the manufacturing method described below is merely exemplary, and any other method may be used for the manufacture.

First, for example, polyvinyl acetate is dissolved as a macromolecular material into a solvent (e.g., methyl ethyl ketone). The color developing/quenching agent, the coloring compound, and the photothermal conversion agent are added to the solution, and dispersed therein. This allows for obtainment of a reversible recording medium coating. Subsequently, the reversible recording medium coating is applied onto the support base 21 to have a thickness of 3 μm, for example, and is dried at 70° C., for example, to form the recording layer 11. Next, for example, a thermosetting acrylic resin dissolved in an organic solvent is applied onto each of the front surface (the surface S1) and the rear surface (the surface S2) of the recording layer 11 to have a thickness of 10 μm, and thereafter is dried to form the pressure-sensitive adhesive layers 12 and 13.

Subsequently, the pressure-sensitive adhesive layer 13 is placed as a lower surface on the barrier film 14 that includes an $SiO_2$ film formed on a plastic film using a CVD method, for example. Next, the barrier film 14 is folded to cover the side surface of the recording layer 11, and respective four sides of the barrier film 14 on the rear surface (the surface S2) side of the recording layer 11 are adhered and sealed by the sealant 15 on the diagonal lines of the recording layer 11. Thus, the reversible recording medium 1 illustrated in FIG. 1 is completed.

1-3. Recording and Deletion Methods of Reversible Recording Medium

In the reversible recording medium 1 according to the present embodiment, recording and deletion may be performed as follows, for example.

First, the recording layer 11 is heated at a temperature enough to decolor a coloring compound, e.g., at a temperature of 120° C., to cause the recording layer 11 to be in a decolored state in advance. Next, a desired position of the recording layer 11 is irradiated with a near infrared ray having a wavelength and an output that are adjusted using, for example, a semiconductor laser, etc. This allows for heat generation of the photothermal conversion agent included in the recording layer 11, causing a coloring reaction (chromogenic reaction) between the coloring compound and the color developing/quenching agent, thus allowing the irradiated part to develop a color.

Meanwhile, in a case where a color-developed part is decolored, irradiation is performed with a near infrared ray at energy enough to cause the color-developed part to reach a decoloring temperature. This allows for heat generation of the photothermal conversion agent included in the recording layer 11, causing a decoloring reaction between the coloring compound and the color developing/quenching agent, thus allowing the irradiated part to be decolored and leading to deletion of a record. Further, in a case of deleting all of records formed in the recording layer 11 all at once, the reversible recording medium 1 is heated at a temperature enough to perform decoloring, e.g., at 120° C. This allows information recorded in the recording layer 11 to be deleted all at once. Thereafter, the above-described operation is performed, thus enabling repeated recording into the recording layer 11.

It is to be noted that the color-developed state and the decolored state are kept insofar as the above-described chromogenic reaction and decoloring reaction such as the near infrared irradiation and the heating are not performed.

1-4. Workings and Effects

As described above, development has been in progress in a display medium to be replaced with a printed matter, and attention is focused, as one example of the display medium, on a reversible recording medium that enables information to be recorded and deleted reversibly by heat. The reversible recording medium generally includes a coloring compound having an electron-donating property, a color developing/quenching agent having an electron-accepting property, and a matrix polymer. Further, addition of a photothermal conversion agent makes it possible for the reversible recording medium to perform recording and deletion by irradiation with light of a specific wavelength. The reversible recording medium is conceived to be applied to, in addition to printing on an IC card, a label, or the like, for example, decoration of a surface of a casing of an electronic apparatus, etc., or an interior, an exterior, or the like of a building.

The reversible recording medium uses, for example, a leuco piment as a color developer, but such a reversible recording medium has an issue that optical color density in proximity of an end surface is decreased due to mixing of water and oxygen from the end surface, resulting in a deterioration in display quality. As a method of solving this issue, for example, a method is conceived in which the reversible recording medium is put into a packaging bag including a gas barrier laminate, and an outer peripheral part is adhered by thermal welding. In addition, a method is conceived in which the reversible recording medium is sandwiched using a barrier layer and the end surface is sealed using a two-part curable adhesive. Alternatively, a method is conceived in which a moisture-proof film is sealed at a collection end of the reversible recording medium by a resin film and a laminating agent. However, in a case where the above-described methods are used, a sealing width is formed on the end surface of the reversible recording medium, which may cause a deterioration in designability.

In contrast, in the reversible recording medium 1 according to the present embodiment, at least the front surface (the surface S1) and the side surface of the recording layer 11 including the leuco pigment are covered with the barrier film 14, and the end parts of the barrier film 14 are sealed using the sealant 15 on the rear surface (the surface S2) side of the recording layer 11. This makes it possible to reduce mixing of water and oxygen into the recording layer 11 while reducing the sealing width of the outer peripheral part serving as a non-display region of the reversible recording medium 1.

As described above, in the reversible recording medium 1 according to the present embodiment, the recording layer 11 is covered from the front surface (the surface S1) to the side surface with the barrier film 14, and the end parts of the barrier film 14 are sealed using the sealant 15 on the rear surface (the surface S2) side of the recording layer 11, which reduces the non-display region in the outer peripheral part of the reversible recording medium 1 while reducing mixing of water and oxygen into the recording layer 11. This makes it possible to improve designability while improving durability of display quality. This consequently makes it possible to provide an electronic apparatus and a decorative member having superior design quality.

Next, description is given of modification examples (modification examples 1 to 6) of the present disclosure. In the following, components similar to those of the above-described embodiment are denoted by the same reference numerals, and descriptions thereof are omitted where appropriate.

2. MODIFICATION EXAMPLES

2-1. Modification Example 1

FIG. 7 schematically illustrates an example of a cross-sectional configuration of a reversible recording medium (a reversible recording medium 2) according to the modification example 1 of the present disclosure. The reversible recording medium 2 differs from the above-described embodiment in that in addition to the barrier film 14 covering the front surface (the surface S1), the side surface, and the rear surface (the surface S2) of the recording layer 11 that allows for reversible change between a recorded state and a deleted state, a barrier film 24 (a second barrier film) covering the rear surface (the surface S2) of the recording layer 11 is provided.

The barrier film 24 serves to suppress mixing of one or both of water and oxygen into the recording layer 11, similarly to the barrier film 14, and covers the rear surface (the surface S1) of the recording layer 11 with the pressure-sensitive adhesive layer 12, for example, interposed therebetween. The barrier film 24 has a configuration similar to that of the barrier film 14, and preferably has a water vapor transmission rate of 0.001 $g/m^2$/day or more and 10 $g/m^2$/day or less, for example, and preferably has high transparency to achieve high visibility of information to be written to the recording layer 11. The barrier film 24 is bonded as a laminated film in which an inorganic oxide film is provided on a base including a plastic film to cause the inorganic oxide film to be provided on the recording layer 11 side, similarly to the barrier film 14. As materials of the barrier film 24, it is possible to use the materials of the barrier film 14 described in the above-described embodiment.

Thus, the barrier film 24 is further provided on the rear surface (the surface S2) side of the recording layer 11, which makes it possible to further reduce mixing of one or both of water and oxygen into the recording layer 11 and further improve durability of display quality.

It is to be noted that FIG. 7 illustrates an example in which the barrier film 24 is formed on the rear surface (the surface S2) side of the recording layer 11 with the pressure-sensitive adhesive layer 12 interposed therebetween and the entirety of the recording layer 11 including the barrier film 24 is covered with the barrier film 14, but this is not limitative. The barrier film 24 may be provided on the rear surface (the surface S2) side of the recording layer 11 with, for example, the barrier film 14, of which the end parts are sealed by the pressure-sensitive adhesive layer 12 and the sealant 15, interposed therebetween, as illustrated in FIG. 8. In this case, the barrier film 24 is bonded to the barrier film 14 with a pressure-sensitive adhesive layer 25 interposed therebetween.

2-2. Modification Example 2

FIG. 9 schematically illustrates an example of a cross-sectional configuration of a reversible recording medium (a reversible recording medium 3) according to the modification example 2 of the present disclosure, and FIG. 10 schematically illustrates another example of the cross-sectional configuration of the reversible recording medium 3 according to the modification example 2 of the present disclosure. The reversible recording medium 3 differs from the above-described embodiment in that a barrier film covering the front surface (the surface S1), the side surface, the rear surface (the surface S2) of the recording layer 11 that allows for reversible change between a recorded state and a deleted state is formed as a laminated film including a barrier film 34A having a configuration similar to that of the barrier film 14 according to the above-described embodiment and a barrier film 34B (a third barrier film) formed using an organic material.

The barrier film according to the present modification example serves to suppress mixing of one or both of water and oxygen into the recording layer 11, and includes two barrier films 34A and 34B as described above. The barrier films 34A and 34B continuously cover the front surface (the surface S1) and the side surface of the recording layer 11 to cause the barrier film 34B and the barrier film 34A to be respectively provided on an inner side and an outer side, and are sealed on the rear surface (the surface S2).

The barrier film 34A has a configuration similar to that of the barrier film 14 according to the above-described embodiment, and preferably has a water vapor transmission rate of 0.001 $g/m^2$/day or more and 10 $g/m^2$/day or less, for example, and preferably has high transparency to achieve high visibility of information to be written to the recording layer 11. The barrier film 34A is bonded as a laminated film in which an inorganic oxide film is provided on a base including a plastic film to cause the inorganic oxide film to be provided on the recording layer 11 side. As materials of the barrier film 34A, it is possible to use the materials of the barrier film 14 described in the above-described embodiment.

The barrier film 34B preferably has a water vapor transmission rate of 0.001 $g/m^2$/day or more and 10 $g/m^2$/day or less, for example, and preferably has high transparency to achieve high visibility of information to be written to the recording layer 11, similarly to the barrier films 14 and 34A. The barrier film 34B is formed using an organic material as described above, and specifically is formed using at least one of hydrofluoroether or ethylene vinyl alcohol, for example. The barrier film 34B preferably has a thickness of 1 μm or more and 100 μm or less, for example. The barrier film 34B may be formed using an application method or a dip method.

It is to be noted that in the above-described embodiment, the end parts of the barrier film 14 are sealed using the sealant 15, but in the present modification example, it is possible to seal the barrier films 34A and 34B by thermal compression bonding.

As described above, the barrier film covering the front surface (the surface S1) and the side surface of the recording layer 11 has a stacked structure including the barrier film 34A that includes a laminated film including the plastic film and the inorganic oxide film and the barrier film 34B that includes the organic material, which makes it possible to seal the barrier film without using the sealant 15 in addition to the effects in the above-described embodiment. In addition, an effect is achieved that allows for an improvement in mechanical strength of a joint part of the respective end surfaces of the barrier film 34A and the barrier film 34B.

2-3. Modification Example 3

FIG. 11 schematically illustrates an example of a cross-sectional configuration of a reversible recording medium (a reversible recording medium 4) according to the modification example 3 of the present disclosure. The reversible recording medium 4 differs from the above-described embodiment in that a UV absorbing layer 16 and a hard coat layer 17 are further provided on the barrier film 14 covering the front surface (the surface S1) of the recording layer 11 that allows for reversible change between a recorded state and a deleted state.

The UV absorbing layer 16 is formed including an ultraviolet absorbing agent, for example, and serves to absorb a ultraviolet ray (e.g., a wavelength of 200 nm or more and 500 nm or less) included in external light and the like to reduce exposure of the recording layer 11 to the ultraviolet ray. Examples of the ultraviolet absorbing agent include triazine, benzoloriazole, and benzophenone having absorption in a wavelength region of 500 nm or less, and the like. The UV absorbing layer 16 has a thickness of 1 μm or more and 20 μm or less, for example.

The hard coat layer 17 serves to protect a surface from cuts, scrapes, dents, solvents, and the like in a case where the reversible recording medium is disposed on a forefront surface. The hard coat layer 17 is formed including, for example, a ultraviolet curable acrylic resin, a melamine resin, or an urethane resin. The hard coat layer 17 has a thickness of 1 μm or more and 20 μm or less, for example.

As described above, providing the UV absorbing layer 16 and the hard coat layer 17 on the front surface (the surface S1) side of the recording layer 11 makes it possible to prevent degradation in the recording layer 11 due to an ultraviolet ray, a solvent, or physical impact and further improve durability of display quality.

2-4. Modification Example 4

FIG. 12 schematically illustrates an example of a cross-sectional configuration of a reversible recording medium (a reversible recording medium 5) according to the modification example 4 of the present disclosure. The reversible recording medium 5 differs from the above-described embodiment in that barrier films 54A, 57, and 54B are respectively and separately provided on the front surface (the surface S1), the side surface, and the rear surface (the surface S2) of the recording layer 11 that allows for reversible change between a recorded state and a deleted state, and a buffer layer 56 is provided between the end surface of the recording layer 11 and the barrier film 57.

The barrier films 54A, 54B, and 57 have a configuration similar to that of the barrier film 14 according to the above-described embodiment, and preferably have a water vapor transmission rate of 0.001 $g/m^2$/day or more and 10 $g/m^2$/day or less, for example, and preferably have high transparency to achieve high visibility of information to be written to the recording layer 11. The barrier film 54A is provided on the entire front surface (the surface S1) of the recording layer 11 with the pressure-sensitive adhesive layer 13 interposed therebetween. The barrier film 54B is provided on the entire rear surface (the surface S2) of the recording layer 11 with the pressure-sensitive adhesive layer 12 interposed therebetween. The barrier film 57 is provided at least on the side surface of the recording layer 11, and is provided on an entire side surface of a laminate including the recording layer 11, the pressure-sensitive adhesive layers 12 and 13, and the barrier films 54A and 54B, for example.

The barrier films 54A, 54B, and 57 each are bonded as a laminated film in which an inorganic oxide film is provided on a base including a plastic film to cause the inorganic oxide film to be provided on the recording layer 11 side. As materials of the barrier films 54A, 54B, and 57, it is possible to use the materials of the barrier film 14 described in the above-described embodiment. In addition, the barrier film 57 may be formed using an organic material such as hydrofluoroether and ethylene vinyl alcohol, for example, similarly to the barrier film 34B in the above-described modification example 2. The barrier films 54A, 54B, and 57 each preferably have a thickness of 10 nm or more and 100 μm or less, for example.

The buffer layer 56 serves to prevent erosion from the barrier film 57 provided on the side surface of the recording layer 11. The buffer layer 56 is configured using a macromolecular material having superior resistance to solvent permeability. As a specific material, the buffer layer 56 is formed using at least one of a water-soluble polyester material, a two-part polyepoxy material, a two-part polyamine material, or a water-soluble emulsion material. Aside from these materials, it is possible to use a material included in heat-insulating layers 62 and 63 to be described later. The buffer layer 56 has a thickness of 1 μm or more and 100 μm or less, for example.

In a case where the barrier film 14 is provided directly on the side surface of the recording layer 11 as with the above-described embodiment, display characteristics may be deteriorated due to a reaction with the material included in the recording layer 11 depending on the material included in the barrier film 14. In contrast, in the present modification example, the side surface of the recording layer 11 is provided with the buffer layer 56 using a macromolecular material having superior resistance to solvent permeability, which makes it possible to prevent a reaction between the recording layer 11 and the barrier film 57. This consequently makes it possible to further improve durability of display quality.

In addition, the barrier film provided on the front surface (the surface S1), the side surface, and the rear surface (the surface S2) of the recording layer 11 is not limited to a barrier film continuously formed similarly to the above-described embodiment and the like, and barrier films may be separately provided on respective surfaces similarly to the barrier films 54A, 54B, and 57 in the present modification example.

2-5. Modification Example 5

FIG. 13 schematically illustrates a cross-sectional configuration of a reversible recording medium (a reversible recording medium 6) according to the modification example 5 of the present disclosure. The reversible recording medium 6 differs from that of the above-described embodiment in that a recording layer 61 that allows for reversible change between a recorded state and a deleted state has a stacked structure in which a plurality of (three in this case) layers (a first layer 61A, a second layer 61B, and a third layer 61C) are stacked. The heat-insulating layers 62 and 63 are respectively provided between the layers 61A and 61B included in the recording layer 61 and between the layers 61B and 61C included in the recording layer 61.

2-5-1. Configuration of Reversible Recording Medium

The recording layer 61 is able to reversibly record and delete information by heat, and has, for example, a configuration in which the first layer 61A, the second layer 61B, and the third layer 61C are stacked in this order from the support base 21 side, as described above. The first layer 61A, the second layer 61B, and the third layer 61C are respectively formed by dispersing, in the macromolecular material, for example, the coloring compounds to be colored in colors different from each other, the color developing/quenching agents corresponding to the respective coloring compounds, and the photothermal conversion agents that absorb light rays of wavelength regions different from each other to generate heat.

Specifically, the first layer 61A includes, for example, a coloring compound (e.g., a coloring compound A) to be colored in a cyan color, a color developing/quenching agent (e.g., a color developing/quenching agent A) corresponding to the coloring compound, and a photothermal conversion agent (e.g. a photothermal conversion agent A) that absorbs an infrared ray of a wavelength $\lambda_1$, for example, to generate heat. The second layer 61B includes, for example, a coloring compound (e.g., a coloring compound B) to be colored in a magenta color, a color developing/quenching agent (e.g., a color developing/quenching agent B) corresponding to the coloring compound, and a photothermal conversion agent (e.g., a photothermal conversion agent B) that absorbs an infrared ray of a wavelength $\lambda_2$, for example, to generate heat. The third layer 61C includes, for example, a coloring compound (e.g., a coloring compound C) to be colored in a yellow color, a color developing/quenching agent (e.g., a color developing/quenching agent C) corresponding to the coloring compound, and a photothermal conversion agent (e.g., a photothermal conversion agent C) that absorbs an infrared ray of a wavelength $\lambda_3$, for example, to generate heat. The wavelengths $\lambda_1$, $\lambda_2$, and $\lambda_3$ differs from each other, thereby obtaining a display medium enabling multicolor display.

It is to be noted that it is preferable to select, for the photothermal conversion agents, a combination of materials having narrow photoabsorption bands that do not overlap one another in a range of 700 nm or more and 2000 nm or less. This makes it possible to selectively color or decolor a desired layer of the first layer 61A, the second layer 61B, and the third layer 61C.

The first layer 61A, the second layer 61B, and the third layer 61C each preferably have a thickness of 1 μm or more and 20 μm or less, for example, and more preferably a thickness of 2 μm or more and 15 μm or less, for example. One reason for this is that, in a case where the layers 61A, 61B, and 61C each have a thickness of less than 1 μm, there is a possibility that sufficient color development density may not be obtained. Further, another reason for this is that, in a case where the layers 61A, 61B, and 61C each have a thickness of more than 20 μm, there is a possibility that a color-developing property and a decoloring property may be deteriorated due to larger amount of heat utilization of each of the layers 61A, 61B, and 61C.

Further, similarly to the above-described recording layer 11, the first layer 61A, the second layer 61B, and the third layer 61C may each include, in addition to the above-described materials, various additives such as a sensitizer and an ultraviolet absorbing agent, for example.

Further, in the recording layer 61 according to the present modification example, the heat-insulating layers 62 and 63 are respectively provided between the first layer 61A and the second layer 61B and between the second layer 61B and the third layer 61C. The heat-insulating layers 62 and 63 are each configured, for example, using a typical macromolecular material having light transmissivity. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, polyvinyl alcohol, modified polyvinyl alcohol, hydroxy ethyl cellulose, carboxymethyl cellulose, starch, and the like. It is to be noted that the heat-insulating layers 62 and 63 may each include various additives such as an ultraviolet absorbing agent, for example.

In addition, the heat-insulating layers 62 and 63 may be each formed using an inorganic material having light transmissivity. For example, use of porous silica, porous alumina, porous titania, porous carbon, a composite thereof, or the like brings preferable effects such as lower thermal conductivity as well as a higher heat-insulating effect. The heat-insulating layers 62 and 63 may be formed by a sol-gel method, for example.

The heat-insulating layers 62 and 63 each preferably have a thickness of 3 μm or more and 100 μm or less, for example, and more preferably a thickness of 5 μm or more and 50 μm or less, for example. One reason for this is that, in a case where the heat-insulating layers 62 and 63 each have a too small thickness, a sufficient heat-insulating effect is not obtained, and, in a case where the heat-insulating layers 62 and 63 each have a too large thickness, thermal conductivity is deteriorated and light transmissivity is lowered upon uniformly heating the entire reversible recording medium 2.

Further, for example, as illustrated in FIG. 14, the buffer layer 56 is preferably provided on a side surface of the recording layer 61, similarly to the reversible recoding medium 5 described in the modification example 4. In addition, although not illustrated, the UV absorbing layer 16 and the hard coat layer 17 may be provided on the barrier film 14 on a front surface (the surface S1) side of the recording layer 61, similarly to the reversible recording medium 4 described in the modification example 3.

2-5-2. Recording and Deletion Methods of Reversible Recording Medium

It is possible for the reversible recording medium 6 according to the present modification example to perform recording and deletion as follows, for example. It is to be noted that description is given here of the recording layer 61 by exemplifying a case where the first layer 61A, the second layer 61B, and the third layer 61C to be colored, respectively, in the cyan color, the magenta color, and the yellow color described above are stacked.

First, heating is performed at a temperature enough to cause the recording layer 61 (the first layer 61A, the second layer 61B, and the third layer 61C) to be decolored, e.g., at 120° C., to cause the recording layer 61 to be in a decolored state in advance. Next, any given part of the recording layer 61 is irradiated with an infrared ray having a wavelength and an output that are optionally selected using, for example, a semiconductor laser, etc. Here, in a case where the first layer 61A is caused to develop a color, irradiation is performed with the infrared ray of the wavelength $\lambda_1$ at energy enough to cause the first layer 61A to reach a color-developing temperature. This allows for heat generation of the photothermal conversion agent A included in the first layer 61A, causing a coloring reaction (chromogenic reaction) between the coloring compound A and the color developing/quenching agent A, thus allowing the irradiated part to develop the cyan color. Likewise, in a case where the second layer 61B is caused to develop a color, irradiation is performed with the infrared ray of the wavelength $\lambda_2$ at energy enough to cause the second layer 61B to reach a color-developing temperature. In a case where the third layer 61C is caused to develop a color, irradiation is performed with the infrared ray of the wavelength $\lambda_3$ at energy enough to cause the third layer 61C to reach a color-developing temperature. This allows for heat generation of each of the photothermal conversion agents B and C included in the second layer 61B and the third layer 61C, causing a coloring reaction between the coloring compound and the color developing/quenching agent, thus allowing the respective irradiated parts to develop the magenta color and the yellow color. In this manner, the irradiation of the respective optional parts with the infrared rays of the corresponding wavelengths makes it possible to record information (e.g., a full-color image).

Meanwhile, in a case where the first layer 61A, the second layer 61B, and the third layer 61C subjected to the color development as described above are each decolored, irradiation is performed with the infrared rays of the respective wavelengths corresponding to the layers 61A, 61B, and 61C at energy enough to cause the layers to reach a decoloring temperature. This allows for heat generation of each of the photothermal conversion agents A, B, and C included in the first layer 61A, the second layer 61B, and the third layer 61C, causing a decoloring reaction each between the coloring compound A and the color developing/quenching agent A, between the coloring compound B and the color developing/quenching agent B, and between the coloring compound C and the color developing/quenching agent C, thus allowing the irradiated part to be decolored and leading to deletion of a record. Further, in a case of deleting all of records formed in the recording layer 61 all at once, the recording layer 61 is heated at a temperature enough to decolor all of the first layer 61A, the second layer 61B, and the third layer 61C, e.g., at 120° C. This allows information recorded in the recording layer 61 (the first layer 61A, the second layer 61B, and the third layer 61C) to be deleted all at once. Thereafter, the above-described operation is performed, thus enabling repeated recording into the recording layer 61.

2-5-3. Workings and Effects

As described above, in the present modification example, for example, three layers (the first layer 61A, the second layer 61B, and the third layer 61C) are formed, which include the coloring compounds (the coloring compound A, the coloring compound B, and the coloring compound C) to be colored in the yellow color, the magenta color, and the cyan color, the respective corresponding color developing/quenching agents (the color developing/quenching agent A, the color developing/quenching agent B, and the color developing/quenching agent C), and the photothermal conversion agents (the photothermal conversion agent A, the photothermal conversion agent B, and the photothermal conversion agent C) having absorption wavelengths different from each other, and these layers are stacked. This makes it possible to provide the reversible recording medium 6 enabling multicolor recording.

2-6. Modification Example 6

The above-described modification example 5 gives an example of providing a multilayer structure in which, as the recording layer 61, a plurality of layers (the first layer 61A, the second layer 61B, and the third layer 61C) to be colored in colors different from each other are formed, and these layers are stacked. However, for example, even a single-layer structure allows for achievement of a reversible recording medium that enables multicolor display.

FIG. 15 illustrates a recording layer 71 that is formed, for example, by mixing three types of microcapsules 71*a*, 71*b*, and 71*c* respectively including the coloring compounds (the coloring compound A, the coloring compound B, and the coloring compound C) to be colored in colors different from each other (e.g., a cyan color (C), a magenta color (M), and a yellow color (Y)), the color developing/quenching agents (the color developing/quenching agent A, the color developing/quenching agent B, and the color developing/quenching agent C) corresponding to the respective coloring compounds, and the photothermal conversion agents (the photothermal conversion agent A, the photothermal conversion agent B, and the photothermal conversion agent C) that absorb light in wavelength regions different from each other to generate heat. The recording layer 71 may be formed, for example, by dispersing the above-described microcapsules 71*a*, 71*b*, and 71*c* in the macromolecular material exemplified as the constituent material of the above-described recording layer 11 and applying the resultant dispersion onto the support base 21. It is to be noted that, for example, the material included in the above-described heat-insulating layers 62 and 63 is preferably used for the microcapsules 71*a*, 71*b*, and 71*c* that contain the above-described materials.

As described above, in the present modification example, the coloring compounds (the coloring compound A, the coloring compound B, and the coloring compound C) to be colored in the yellow color, the magenta color, and the cyan color, the corresponding color developing/quenching agents (the color developing/quenching agent A, the color developing/quenching agent B, and the color developing/quenching agent C), and the photothermal conversion agents (the photothermal conversion agent A, the photothermal conversion agent B, and the photothermal conversion agent C) having absorption wavelengths different from each other are respectively encapsulated in the microcapsules 71*a*, 71*b*, and 71*c*, and they are dispersed in the macromolecular material to form the recording layer 71. This makes it possible to provide the reversible recording medium 3 having a single-layer structure and enabling multicolor display.

It is to be noted that the embodiment, the modification example 5, and the like described above give examples in which the recording layer 11 and the recording layer 61 (the first layer 61A, the second layer 61B, and the third layer 61C) are each formed using a single (one type of) coloring compound; however, this is not limitative. In the above-described reversible recording media 1 and 2, the recording layers 11 and 61 (the first layer 61A, the second layer 61B, and the third layer 61C) may be each formed using a mixture of a plurality of types of coloring compounds to be colored in different colors.

It is difficult, in a reversible recording medium, to perform color reproduction of CMY (cyan, magenta, and yellow) according to Japan Color certification system, using a single coloring compound (a leuco pigment). Further, the photothermal conversion agent has a slight color tone, and thus the type and the content of the photothermal conversion agent cause a color tone of each of the recording layers 11 and 61 to be slightly changed. Developing the coloring compound for each and every slight change causes manufacturing efficiency to be significantly lowered.

Accordingly, forming the recording layer 11 and the recording layer 61 (the first layer 61A, the second layer 61B, and the third layer 61C) by mixing a plurality of types of coloring compounds (the coloring compound A, the coloring compound B, and the coloring compound C) makes it possible to reproduce various colors including CMY according to the Japan Color certification system. For example, the cyan color may be reproduced by mixing a coloring compound to be colored in a blue color and a coloring compound to be colored in a green color at a predetermined rate. The magenta color may be reproduced by mixing a coloring compound to be colored in a red color and a coloring compound to be colored in an orange color at a predetermined rate.

3. APPLICATION EXAMPLES

Next, description is given of application examples of the reversible recording media (the reversible recording media 1 to 7) described in the embodiment and the modification examples 1 to 6 described above. However, a configuration of an electronic apparatus described below is merely exemplary, and the configuration may be varied appropriately. Any of the reversible recording media 1 to 3 is applicable to a portion of various electronic apparatuses or various clothing accessories. For example, the reversible recording media 1 to 3 is applicable to a portion of clothing accessories such as a watch (wristwatch), a bag, clothes, a hat, a helmet, headphones, glasses, and shoes, as a so-called wearable terminal. In addition, the type of the electronic apparatus is not particularly limited, and examples include a wearable display such as a head-up display or a head-mounted display, a portable device such as a portable music player or a portable game machine, a robot, a refrigerator, a washing machine, and the like. Further, it is also possible to apply, not only to the electronic apparatuses and the clothing accessories, but also to, as decorative members, the interior and exterior of automobiles, the interior and exterior such as walls of buildings, the exterior of furniture such as desks, the interior and exterior such as walls of buildings, the exterior of furniture such as desks, and the like.

Application Example 1

FIGS. 16A and 16B each illustrate an appearance of an integrated circuit (IC) card with a rewritable function. The IC card has a card surface that serves as a printing surface 110, and includes, for example, a sheet-shaped reversible recording medium 1 or the like that is adhered thereto. The IC card allows for drawing on the printing surface 110 as well as rewriting and deletion thereof appropriately by disposing the reversible recording medium 1 or the like on the printing surface, as illustrated in FIGS. 16A and 16B.

Application Example 2

FIG. 17A illustrates a configuration of an appearance of a front surface of a smartphone, and FIG. 17B illustrates a configuration of an appearance of a rear surface of the smartphone illustrated in FIG. 17A. The smartphone includes, for example, a display part 210, a non-display part 220, and a casing 230. An entire surface, for example, of the casing 230 on the rear surface side is provided with, for example, the reversible recording medium 1 or the like as the exterior member of the casing 230. This allows for display of various color patterns as illustrated in FIG. 17B. It is to be noted that, although the smartphone is exemplified here, this is not limitative; it is also possible to apply, for example, to a notebook personal computer (PC), a tablet PC, or the like.

Application Example 3

FIGS. 18A and 18B each illustrate an appearance of a bag. The bag includes a storing part 310 and a handle 320, for example, and the reversible recording medium 1, for example, is attached to the storing part 310, for example. Various letters and patterns are displayed on the storing part 310 by means of the reversible recording medium 1, for example. In addition, the attachment of the reversible recording medium 1 or the like to a part of the handle 320 allows for display of various color patterns, and allows for change in design of the storing part 310, as illustrated, from the example of FIG. 18A to the example of FIG. 18B. It is also possible to use the reversible recording medium 1 or the like for the purpose of fashion in this manner.

Application Example 4

FIG. 19 illustrates a configuration example of a wristband able to record, in an amusement park, attraction-riding history, schedule information, and the like, for example. The wristband includes belt parts 411 and 412 and an information recording part 420. The belt parts 411 and 412 have a band shape, for example, and respective ends (not illustrated) thereof are configured to be connectable to each other. The reversible recording medium 1 or the like, for example, is adhered to the information recording part 420, and attraction-riding history MH2 and schedule information IS (IS1 to IS3) as described above and an information code CD, for example, are recorded. In the amusement park, a visitor is able to record the above-described information by waving the wristband over a drawing apparatus installed at every location of attraction-riding reservation spots.

A riding history mark MH1 indicates the number of attractions ridden by a visitor who wears the wristband in the amusement park. In this example, as the visitor rides the more attractions, the more star-shaped marks are recorded as the riding history mark MH1. It is to be noted that this is not limitative; for example, the color of the mark may be changed in accordance with the number of attractions ridden by the visitor.

The schedule information IS in this example indicates a schedule of the visitor. In this example, information about all of events including an event reserved by the visitor and an event to be held in the amusement park is recorded as the schedule information IS1 to IS3. Specifically, in this example, a title of an attraction (an attraction 201) of which riding is reserved by the visitor and scheduled time of the riding are recorded as the schedule information IS1. Further, an event such as a parade in the park and its scheduled starting time are recorded as the schedule information IS2. Furthermore, a restaurant reserved beforehand by a visitor and its scheduled mealtime are recorded as the schedule information IS3.

The information code CD records, for example, identification information IID that is used to identify the wristband and website information IWS.

Application Example 5

FIG. 20A illustrates an appearance of an upper surface of an automobile, and FIG. 20B illustrates an appearance of a side surface of the automobile. The reversible recording medium 1 or the like according to the present disclosure, as described above, may be provided, for example, to a vehicle body such as a bonnet 511, a bumper 512, a roof 513, a trunk cover 514, a front door 515, a rear door 516, or a rear bumper 517, thereby enabling various information and color patterns to be displayed in each part. In addition, the reversible recording medium 1 or the like is provided on the interior of the automobile, for example, on a steering wheel, a dashboard, or the like, thereby enabling various color patterns to be displayed.

Application Example 6

FIG. 21 illustrates an appearance of a cosmetic case. The cosmetic case includes, for example, a containing part 710 and a lid 720 covering the containing part 710. A reversible recording medium 100, for example, is adhered to the lid 720, for example. The lid 720 is decorated with, for example, a pattern or a color pattern as illustrated in FIG. 21, letters, or the like by means of the reversible recording medium 100. It is possible to rewrite and delete the pattern, the color pattern, the letters, or the like on the lid 720 by a drawing and deleting apparatus located in a store, for example. It is to be noted that it is possible to attach the reversible recording medium 100 not only to a front surface (the lid 720) of the cosmetic case but also a rear surface (the containing part 710) and the like.

4. WORKING EXAMPLES

Next, description is given in detail of working examples of the present disclosure.

Experiment 1

Experimental Example 1-1

First, a recording layer including one layer was formed using the above-described manufacturing method. Subsequently, a barrier film that had a water vapor transmission rate of 0.01 $g/m^2$/day and included a laminated film including a plastic film and an inorganic oxide film was prepared. The barrier film was produced to continuously cover the recording layer from a front surface to a side surface and a rear surface and have end parts sealed using an adhesive dryable at room temperature on the rear surface on diagonal lines of the recording layer. A reversible recording medium thereby obtained was bonded directly above glass.

Experimental Example 1-2

In an experimental example 1-2, a reversible recording medium was produced using a method similar to that of the experimental example 1-1 except that a recording layer including three layers to be colored in colors different from each other was formed; in addition to the barrier film continuously covering the recording layer from the front surface to the side surface and the rear surface, a barrier film covering the rear surface was formed separately; and the barrier film was sealed in an outer peripheral part of the rear surface of the recording layer, and the reversible recording medium was bonded to a portable device.

Experimental Example 1-3

In an experimental example 1-3, a reversible recording medium was produced using a method similar to that of the experimental example 1-2 except that the barrier film was sealed on diagonal lines of the recording layer, and the reversible recording medium was bonded to a portable device.

Experimental Example 1-4

In an experimental example 1-4, a reversible recording medium was produced using a method similar to that of the experimental example 1-1 except that a recording layer including three layers to be colored in colors different from each other was formed, and the reversible recording medium was bonded to a portable device.

Experimental Example 1-5

In an experimental example 1-5, a reversible recording medium produced using a method similar to that of the experimental example 1-3 was bonded directly below glass of a smartphone.

Experimental Example 1-6

In an experimental example 1-6, a reversible recording medium was produced using a method similar to that of the experimental example 1-2 except that the recording layer was continuously covered from the front surface to the side surface and the rear surface and the barrier film was sealed using an adhesive dryable at room temperature on the rear surface on diagonal lines of the recording layer, and thereafter a barrier film covering the rear surface was formed separately, and the reversible recording medium was bonded to a portable device.

Experimental Example 1-7

In an experimental example 1-7, a reversible recording medium produced using a method similarly to that of the experimental example 1-2 except that the barrier film continuously covering the recording layer from the front surface to the side surface and the rear surface had a two-layer structure that included a barrier film including a plastic film and an inorganic oxide film and a barrier film formed using an organic material, and was sealed using thermal compression bonding in an outer peripheral part of the rear surface of the recording layer, and the reversible recording medium was bonded to a portable device.

Experimental Example 1-8

In an experimental example 1-8, a reversible recording medium was produced using a method similar to that of the experimental example 1-3 except that a laminated film having a water vapor transmission rate of 0.001 $g/m^2/day$ and including a plastic film and an inorganic oxide film was used as a barrier film, and the reversible recording medium was bonded to a portable device.

Experimental Example 1-9

In an experimental example 1-9, a reversible recording medium was produced using a method similar to that of the experimental example 1-3 except that a laminated film having a water vapor transmission rate of 9 $g/m^2/day$ and including a plastic film and an inorganic oxide film was used as a barrier film, and the reversible recording medium was bonded to a portable device.

Experimental Example 1-10

In an experimental example 1-10, a reversible recording medium was produced using a method similar to that of the experimental example 1-3 except that the barrier film was sealed on diagonal lines of the recording layer and an UV absorbing layer and a hard coat layer were provided on the barrier layer on the front surface side of the recording layer, and the reversible recording medium was bonded to a portable device.

Experimental Example 1-11

In an experimental example 1-11, a reversible recording medium was produced using a method similar to that of the experimental example 1-3 except that the barrier film was sealed using a thermosetting epoxy resin on diagonal lines of the recording layer, and the reversible recording medium was bonded to a portable device.

Experimental Example 1-12

In an experimental example 1-12, a reversible recording medium was produced using a method similar to that of the experimental example 1-3 except that a recording layer including two layers to be colored in colors different from each other was used, and the reversible recording medium was bonded to a portable device.

Experimental Example 1-13

In an experimental example 1-13, a reversible recording medium was produced using a method similar to that of the experimental example 1-3 except that in addition to the barrier film continuously covering the recording layer from the front surface to the side surface and the rear surface, a barrier film covering the rear surface was formed separately and these barrier films were not sealed, and the reversible recording medium was bonded to a portable device.

Experimental Example 1-14

In an experimental example 1-14, a reversible recording medium was produced using a method similar to that of the experimental example 1-3 except that in addition to the barrier film continuously covering the recording layer from the front surface to the side surface and the rear surface, a barrier film covering the rear surface was formed separately and these barrier films were sealed using an UV curable resin, and the reversible recording medium was bonded to a portable device.

Experimental Example 1-15

In an experimental example 1-15, a reversible recording medium was produced using a method similar to that of the experimental example 1-3 except that a laminated film having a water vapor transmission rate of 14 $g/m^2/day$ and including a plastic film and an inorganic oxide film was used as a barrier film, and the reversible recording medium was bonded to a portable device.

Experimental Example 1-16

In an experimental example 1-16, a reversible recording medium was produced using a method similar to that of the experimental example 1-3 except that a laminated film having a water vapor transmission rate of 10.5 $g/m^2/day$ and including a plastic film and an inorganic oxide film was used as a barrier film, and the reversible recording medium was bonded to a portable device.

As for the experimental examples 1-1 to 1-16 described above, optical color densities and color differences (ΔE*) of the reversible recording media before and after storage under high temperature and high humidity conditions were measured, and results thereof are listed in Table 1. The optical color densities and the color differences (ΔE*) were calculated using the following methods. In addition, mechanical characteristics were evaluated using the following method, and evaluation results were also listed in Table 1.

(Evaluation of Optical Color Density)

Each of the recording layers was irradiated with a laser (an output of 3 W) of a wavelength of 920 nm, for example, to develop a color, and thereafter a spectrophotometer available from X-rite Inc. was used to measure color density (OD) at a pitch of 5 mm from an end part of the recording layer, and the measured color density (OD) was used as an initial value. Next, as the high temperature and high humidity conditions, storage was performed at a temperature of 60 degrees and a humidity of 80% for 100 hours, and thereafter the spectrophotometer available from X-rite Inc. was used to measure the color density (OD) at a pitch of 5 nm from the end part of the recording layer again, and a ratio with respect to the initial value is expressed in percentage.

(Evaluation of Color Difference (ΔE*))

A raw image of each of the recording layers was captured in tiff format, and was converted into a merged image of 100×200 pixels using Photoshop (registered trademark) to determine values of L, a, and b in each of the pixels by image processing. Next, after 100 hours at a temperature of 60 degrees and a humidity of 80%, a color space distance was determined from the values L, a, and b in a pixel in a middle part and the values of L, a, and b in each of the pixels. As for evaluation of the color difference (ΔE*), ΔE* represented by the following formula (1) representing a color shift from an initial stage was used as an index.

(Math 1)

$$\Delta E^*=\sqrt{(^*\text{initial stage}-L^*\text{after 100 hours})^2+(a^*\text{initial stage}-a^*\text{after 100 hours})^2+(b^*\text{initial stage}-b^*\text{after 100 hours})^2} \quad (1)$$

(Evaluation Method and Criteria of Mechanical Characteristics)

The mechanical characteristics were determined by a hardness test (a pencil method) conforming to JIS K5600-5-4.

Tester: BEVS Pencil hardness Tester

Pencil: A pencil of UNI available from Mitsubishi Pencil Co., Ltd. was sharpened, and the lead of the pencil was polished on a flat surface to flatten the tip of the lead for use.

Test Method: The pencil was reciprocated five times by a movement amount of 10 mm or more by the above-described tester, and judgement was made at two testing points (the angle of the pencil was constantly changed and the tip of the lead was always acute).

Judgement: A case where no dent and no scratch were made on a front surface by a pencil with pencil hardness of F or harder was ranked B, and a case where no dent and no scratch was made on the front surface by a pencil with pencil hardness of 2H or harder was ranked A.

TABLE 1

| | Distance from End Surface (mm) | | Mechanical |
|---|---|---|---|
| | Color Density | ΔE* | Characteristics |
| Experimental Example 1-1 | 3.8 | 4.5 | B |
| Experimental Example 1-2 | 2 | 1.8 | B |
| Experimental Example 1-3 | 1.5 | 1.4 | B |
| Experimental Example 1-4 | 3 | 2.6 | B |
| Experimental Example 1-5 | 0.5 | 0.3 | A |
| Experimental Example 1-6 | 1.6 | 1.2 | B |
| Experimental Example 1-7 | 2.5 | 2.0 | B |
| Experimental Example 1-8 | 0.3 | 0.2 | B |
| Experimental Example 1-9 | 4.9 | 4.8 | B |
| Experimental Example 1-10 | 2 | 1.8 | A |
| Experimental Example 1-11 | 3.1 | 2.6 | B |
| Experimental Example 1-12 | 1.8 | 2.3 | B |
| Experimental Example 1-13 | 6.6 | 6.5 | B |
| Experimental Example 1-14 | — | — | B |
| Experimental Example 1-15 | 5.8 | 5.2 | B |
| Experimental Example 1-16 | 4.9 | 5.2 | B |

Experiment 2

Experimental Example 2-1

First, a recording layer including one layer was formed using the above-described manufacturing method. Subsequently, a barrier film that had a water vapor transmission rate 0.01 $g/m^2/day$ and included a laminated film including a plastic film and an inorganic oxide film was prepared, and covered a front surface of the recording layer. Next, a buffer layer including water-soluble polyester was formed on a side surface of the recording layer, and thereafter a reversible recording medium in which the barrier film including water-soluble polyester was formed on the side surface of the recording layer was bonded directly above glass.

Experimental Example 2-2

In an experimental example 2-2, a reversible recording medium was produced using a method similar to that of the experimental example 2-1 except that a recording layer including three layers to be colored in colors different from each other was formed, and a barrier film was formed on a front surface and of the recording layer, and the reversible recording medium was bonded to a portable device.

Experimental Example 2-3

In an experimental example 2-3, a reversible recording medium was produced using a method similar to that of the experimental example 2-2 except that a buffer layer and a barrier film on the side surface were formed using a two-part polyepoxy resin, and the reversible recording medium was bonded to a portable device.

Experimental Example 2-4

In an experimental example 2-4, a reversible recording medium was produced using a method similar to that of the experimental example 2-3 except that a buffer layer and a barrier film on the side surface were formed using a two-part polyamine resin, and the reversible recording medium was bonded to a portable device.

Experimental Example 2-5

In an experimental example 2-5, a reversible recording medium was produced using a method similar to that of the experimental example 2-3 except that a buffer layer and a barrier film on the side surface were formed using a water-soluble emulsion, and the reversible recording medium was bonded to a portable device.

Experimental Example 2-6

In an experimental example 2-6, a reversible recording medium was produced using a method similar to that of the experimental example 2-3 except that a buffer layer and a barrier film on the side surface were formed using water-soluble polyester, and the reversible recording medium was bonded directly below glass of a smartphone.

Experimental Example 2-7

In an experimental example 2-7, a reversible recording medium was produced using a method similar to that of the experimental example 2-3 except that a buffer layer was formed using water-soluble polyester and a buffer film on the side surface was formed using a laminated film including a plastic film and an inorganic oxide film, and the reversible recording medium was bonded to a portable device.

Experimental Example 2-8

In an experimental example 2-8, a reversible recording medium was produced using a method similar to that of the experimental example 2-3 except that a buffer layer was formed using water-soluble polyester and a buffer film on the side surface was formed using an organic material, and the reversible recording medium was bonded to a portable device.

Experimental Example 2-9

In an experimental example 2-9, a reversible recording medium was produced using a method similar to that of the experimental example 2-1 except that a barrier film that had a water vapor transmission rate of 3 $g/m^2/day$ and included a laminated film including a plastic film and an inorganic oxide film was prepared and covered the front surface and a bottom surface of the recording layer, and the reversible recording medium was bonded to a portable device.

Experimental Example 2-10

In an experimental example 2-10, a reversible recording medium was produced using a method similar to that of the experimental example 2-1 except that a barrier film that had a water vapor transmission rate of 10 $g/m^2/day$ and included a laminated film including a plastic film and an inorganic oxide film was prepared and covered the front surface and the bottom surface of the recording layer, and the reversible recording medium was bonded to a portable device.

Experimental Example 2-11

In an experimental example 2-11, a reversible recording medium was produced using a method similar to that of the experimental example 2-3 except that an UV absorbing layer and a hard coat layer were provided on the barrier film provided on the front surface of the recording layer, and the reversible recording medium was bonded to a portable device.

Experimental Example 2-12

In an experimental example 2-12, a reversible recording medium was produced using a method similar to that of the experimental example 2-3 except that the recording layer including one layer was formed similarly to the experimental example 2-1, and the reversible recording medium was bonded to a portable device.

Experimental Example 2-13

In an experimental example 2-13, a reversible recording medium was produced using a method similar to that of the experimental example 2-3 except that no buffer layer was provided, and the reversible recording medium was bonded to a portable device.

Experimental Example 2-14

In an experimental example 2-14, a reversible recording medium was produced using a method similar to that of the experimental example 2-3 except that the buffer layer and the barrier film on the side surface of the recording layer were formed by spray coating, and the reversible recording medium was bonded to a portable device.

Experimental Example 2-15

In an experimental example 2-15, a reversible recording medium was produced using a method similar to that of the experimental example 2-1 except that a barrier film that had a water vapor transmission rate of 14 $g/m^2/day$ and included a laminated film including a plastic film and an inorganic oxide film was prepared and covered the front surface and the bottom surface of the recording layer, and the reversible recording medium was bonded to a portable device.

As for the experimental examples 2-1 to 2-15 described above, optical color densities and color differences ($\Delta E^*$) in end parts of the reversible recording media were measured using a method similar to that in the experiment 1, and results thereof are listed in Table 1. In addition, mechanical characteristics were also evaluated, and results thereof are also listed.

TABLE 2

| | Distance from End Surface (mm) | | Mechanical |
|---|---|---|---|
| | Color Density | ΔE* | Characteristics |
| Experimental Example 2-1 | 3.4 | 2.7 | B |
| Experimental Example 2-2 | 2.0 | 1.6 | B |
| Experimental Example 2-3 | 2.5 | 2.1 | B |
| Experimental Example 2-4 | 3.8 | 3.2 | B |
| Experimental Example 2-5 | 4.8 | 4.4 | B |
| Experimental Example 2-6 | 2.0 | 1.6 | B |
| Experimental Example 2-7 | 0.7 | 0.6 | B |
| Experimental Example 2-8 | 4.2 | 4.4 | B |
| Experimental Example 2-9 | 4.0 | 3.8 | B |
| Experimental Example 2-10 | 4.8 | 4.9 | B |
| Experimental Example 2-11 | 1.7 | 1.2 | A |
| Experimental Example 2-12 | 2.9 | 2.5 | B |
| Experimental Example 2-13 | 8.2 | 7.4 | B |
| Experimental Example 2-14 | 2.6 | 2.2 | — |
| Experimental Example 2-15 | 7.7 | 7.5 | B |

Although the present disclosure has been described above with reference to the embodiment and the modification examples 1 to 6, the present disclosure is not limited to aspects described in the embodiment and the like described above, and may be modified in a variety of ways. For example, the embodiment and the modification examples 1 to 6 may be combined with each other. For example, the recording layers 61 and 71 described in the modification example 5 and the modification example 6 are applicable to each of the recording layers 11 of the reversible recording media 1 to 5 according to the embodiment and the modification examples 1 to 4.

In addition, for example, not all the components described in the embodiment and the like described above may necessarily be provided, and any other component may be further included. For example, the rear surface (the surface S2) of the recording layer 11 may be provided with a reflective layer. The provision of the reflective layer allows for more vivid color display. The reflective layer may be provided in contact with the surface S2 of the recording layer 11, or may be provided on the surface S2 of the recording layer 11 with the pressure-sensitive adhesive layer 12, the barrier film 14, or the like interposed therebetween. Moreover, the materials and the thicknesses of the components described above are merely examples, and are not limited to those described herein.

Further, although the modification example 6 described above gives an example in which the microcapsule is used to perform multicolor display in the single-layer structure, this is not limitative; for example, it is also possible to use a fiber-shaped three-dimensional stereoscopic structure to perform the multicolor display. For example, the fiber to be used here preferably has a so-called core-sheath structure configured by a core part that includes the coloring compound to be colored in a desired color, the color developing/quenching agent corresponding thereto, and the photothermal conversion material, and by a sheath part that coats the core part and includes a heat-insulating material. By forming the three-dimensional stereoscopic structure using a plurality of types of fibers having the core-sheath structure and including respective coloring compounds to be colored in different colors, it becomes possible to produce a reversible recording medium that enables multicolor display.

Furthermore, although the embodiment and the like described above give an example in which the laser is used to perform color development and decoloring of respective recording layers, this is not limitative. For example, a thermal head may also be used to perform the color development and the decoloring.

It is to be noted that the effects described in the present specification are merely exemplary and not limitative, and may have other effects.

It is to be noted that the present disclosure may have the following configurations.

(1)

A reversible recording medium including:

a recording layer including a leuco pigment as a coloring compound; and a first barrier film that is provided on one surface and a side surface of the recording layer and suppresses mixing of at least one of water or oxygen.

(2)

The reversible recording medium according to (1), in which the first barrier film is continuously provided from the one surface to the side surface of the recording layer.

(3)

The reversible recording medium according to (1) or (2), in which the first barrier film is continuously provided from the one surface to another surface opposed to the one surface, and an end part of the first barrier film is sealed by a sealant in an outer peripheral part of the other surface.

(4)

The reversible recording medium according to any one of (1) to (3), in which the recording layer and the first barrier film each have a rectangular shape, and four sides of the first barrier film are sealed to each other by a sealant on diagonal lines of another surface of the recording layer.

(5)

The reversible recording medium according to any one of (1) to (4), in which the first barrier film has a water vapor transmission rate of 0.001 $g/m^2$/day or more and 10 $g/m^2$/day or less.

(6)

The reversible recording medium according to any one of (1) to (5), in which the first barrier film includes a plastic film as a base and an inorganic oxide film provided on the base.

(7)

The reversible recording medium according to (6), in which the base is formed using at least one of polyethylene terephthalate (PET), polycarbonate (PC), or polymethyl methacrylate (PMMA).

(8)

The reversible recording medium according to (6) or (7), in which the inorganic oxide film includes a single-layer film or a laminated film using at least one of a silicon oxide film, an aluminum oxide film, or a silicon nitride film.

(9)

The reversible recording medium according to any one of (1) to (8), further including a second barrier film that suppresses mixing of at least one of water or oxygen into another surface opposed to the one surface of the recording layer.

(10)

The reversible recording medium according to (9), in which the second barrier film is provided on the other surface of the recording layer, and the first barrier film is provided on the second barrier film.

(11)

The reversible recording medium according to (9) or (10), in which the second barrier film is provided on the other surface of the recording layer with the first barrier film interposed therebetween.

(12)

The reversible recording medium according to any one of (1) to (11), further including a third barrier film between the recording layer and the first barrier film.

(13)

The reversible recording medium according to (12), in which the third barrier film is formed using at least one of hydrofluoroether or ethylene vinyl alcohol.

(14)

The reversible recording medium according to any one of (3) to (13), in which the sealant includes a thermosetting resin.

(15)

The reversible recording medium according to any one of (1) to (14), in which the recording layer includes a pressure-sensitive adhesive layer on the one surface and another surface opposed to the one surface, and the first barrier film is provided with the pressure-sensitive adhesive layer interposed therebetween.

(16)

The reversible recording medium according to any one of (1) to (15), further including a buffer layer on the side surface of the recording layer.

(17)

The reversible recording medium according to (16), in which the buffer layer is formed using at least one of a water-soluble polyester material, a two-part polyepoxy material, a two-part polyamine material, or a water-soluble emulsion material.

(18)

The reversible recording medium according to any one of (1) to (17), further including at least one of an ultraviolet absorbing layer or a hard coat layer on the first barrier film provided on the one surface of the recording layer.

(19)

The reversible recording medium according to any one of (1) to (18), in which the recording layer includes a plurality of layers to be colored in colors different from each other.

(20)

An exterior member having at least one surface provided with a reversible recording medium on a support base, the reversible recording medium including:

a recording layer including a leuco pigment as a coloring compound; and a first barrier film that is provided on one surface and a side surface of the recording layer and suppresses mixing of at least one of water or oxygen.

This application claims the benefit of Japanese Priority Patent Application JP2018-123918 filed with the Japan Patent Office on Jun. 29, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A reversible recording medium comprising:

a recording layer including a leuco pigment as a coloring compound; and a first barrier film that is provided on one surface and a side surface of the recording layer and suppresses mixing of at least one of water or oxygen with the recording layer, wherein the first barrier film is continuously provided from the one surface to another surface of the recording layer that is opposed to the one surface, and an end part of the first barrier film is sealed by a sealant to an outer peripheral part of the another surface.

2. The reversible recording medium according to claim 1, wherein the first barrier film has a water vapor transmission rate of 0.001 g/m2/day or more and 10 g/m2/day or less.

3. The reversible recording medium according to claim 1, wherein the first barrier film includes a plastic film as a base and an inorganic oxide film provided on the base.

4. The reversible recording medium according to claim 3, wherein the base is formed using at least one of polyethylene terephthalate (PET), polycarbonate (PC), or polymethyl methacrylate (PMMA).

5. The reversible recording medium according to claim 3, wherein the inorganic oxide film includes a single-layer film or a laminated film using at least one of a silicon oxide film, an aluminum oxide film, or a silicon nitride film.

6. The reversible recording medium according to claim 1, further comprising a second barrier film that suppresses mixing of at least one of water or oxygen into another surface of the recording layer that is opposed to the one surface of the recording layer.

7. The reversible recording medium according to claim 6, wherein the second barrier film is provided on the another surface of the recording layer, and the first barrier film is provided on the second barrier film.

8. The reversible recording medium according to claim 6, wherein the second barrier film is provided on the another surface of the recording layer with the first barrier film interposed therebetween.

9. The reversible recording medium according to claim 1, further comprising a third barrier film between the recording layer and the first barrier film.

10. The reversible recording medium according to claim 9, wherein the third barrier film is formed using at least one of hydrofluoroether or ethylene vinyl alcohol.

11. The reversible recording medium according to claim 3, wherein the sealant includes a thermosetting resin.

12. The reversible recording medium according to claim 1, wherein the recording layer includes a pressure-sensitive adhesive layer on the one surface and another surface opposed to the one surface, and the first barrier film is provided with the pressure-sensitive adhesive layer interposed therebetween.

13. The reversible recording medium according to claim 1, further comprising a buffer layer on the side surface of the recording layer.

14. The reversible recording medium according to claim 13, wherein the buffer layer is formed using at least one of a water-soluble polyester material, a two-part polyepoxy material, a two-part polyamine material, or a water-soluble emulsion material.

15. The reversible recording medium according to claim 1, further comprising at least one of an ultraviolet absorbing layer or a hard coat layer on the first barrier film provided on the one surface of the recording layer.

16. The reversible recording medium according to claim 1, wherein the recording layer includes a plurality of layers to be colored in colors different from each other.

17. A reversible recording medium comprising:

a recording layer including a leuco pigment as a coloring compound; and a first barrier film that is provided on one surface and a side surface of the recording layer and suppresses mixing of at least one of water or oxygen, wherein the recording layer has a rectangular shape, and four sides of the first barrier film are sealed by a sealant on diagonal lines of another surface of the recording layer that is opposed to the one surface.

18. An exterior member comprising a reversible recording medium on at least one surface of a support base, the reversible recording medium comprising:

a recording layer including a leuco pigment as a coloring compound; and a first barrier film that is provided on one surface and a side surface of the recording layer and suppresses mixing of at least one of water or oxygen with the recording layer, wherein the first barrier film is continuously provided from the one surface to another surface of the recording layer that is opposed to the one surface, and an end part of the first barrier film is sealed by a sealant to an outer peripheral part of the another surface.

19. An exterior member comprising a reversible recording medium on at least one surface of a support base, the reversible recording medium comprising:

a recording layer including a leuco pigment as a coloring compound; and a first barrier film that is provided on one surface and a side surface of the recording layer and suppresses mixing of at least one of water or oxygen with the recording layer, wherein the recording layer has a rectangular shape, and four sides of the first barrier film are sealed by a sealant on diagonal lines of another surface of the recording layer that is opposed to the one surface.

* * * * *